(12) United States Patent
Valenti et al.

(10) Patent No.: US 9,683,066 B2
(45) Date of Patent: Jun. 20, 2017

(54) MODIFIED POLYMER COMPOSITIONS

(75) Inventors: Silvia Valenti, Halle (DE); Evemarie Hamann, Halle (DE); Norbert Jantsch, Halle (DE); Sven Thiele, Halle (DE)

(73) Assignee: TRINSEO EUROPE GMBH, Horgen (CH)

( * ) Notice: Subject to any disclaimer, the term of this patent is extended or adjusted under 35 U.S.C. 154(b) by 328 days.

(21) Appl. No.: 14/385,565

(22) PCT Filed: Mar. 20, 2012

(86) PCT No.: PCT/EP2012/054919
§ 371 (c)(1),
(2), (4) Date: Dec. 15, 2014

(87) PCT Pub. No.: WO2013/139378
PCT Pub. Date: Sep. 26, 2013

(65) Prior Publication Data
US 2015/0086735 A1    Mar. 26, 2015

(51) Int. Cl.
| C08F 236/10 | (2006.01) |
|---|---|
| C08F 36/06 | (2006.01) |
| C08C 19/25 | (2006.01) |
| C08C 19/44 | (2006.01) |
| C08K 5/548 | (2006.01) |
| B60C 1/00 | (2006.01) |
| C08L 47/00 | (2006.01) |

(52) U.S. Cl.
CPC .......... *C08F 236/10* (2013.01); *B60C 1/0016* (2013.04); *B60C 1/0025* (2013.04); *C08C 19/25* (2013.01); *C08C 19/44* (2013.01); *C08F 36/06* (2013.01); *C08K 5/548* (2013.01); *C08L 47/00* (2013.01); *Y10T 428/139* (2015.01)

(58) Field of Classification Search
CPC .... C08F 236/10; C08F 36/06; Y10T 428/139; C08C 19/25; C08C 19/44; C08K 5/548; B60C 1/0016; B60C 1/0025; C08L 47/00
See application file for complete search history.

(56) References Cited

U.S. PATENT DOCUMENTS

| | | |
|---|---|---|
| 3,078,254 A | 2/1963 | Zelinski et al. |
| 3,244,664 A | 4/1966 | Zelinski et al. |
| 3,281,383 A | 10/1966 | Zelinski et al. |
| 3,350,345 A | 10/1967 | Vanderbilt et al. |
| 3,692,874 A | 9/1972 | Farrar et al. |
| 3,978,103 A | 8/1976 | Meyer-Simon et al. |
| 4,002,594 A | 1/1977 | Fetterman |
| 4,048,206 A | 9/1977 | Voronkov et al. |
| 4,082,790 A | 4/1978 | Speier |
| 4,474,908 A | 10/1984 | Wagner |
| 4,544,711 A | 10/1985 | Mancinelli |
| 4,616,069 A | 10/1986 | Watanabe et al. |
| 4,839,434 A | 6/1989 | Bronstert et al. |
| 5,151,469 A | 9/1992 | Hergenrother et al. |
| 6,127,472 A | 10/2000 | Kobayashi et al. |
| 6,147,242 A | 11/2000 | Batz-Sohn |
| 6,166,108 A | 12/2000 | Materne et al. |
| 6,204,339 B1 | 3/2001 | Waldman et al. |
| 6,229,036 B1 | 5/2001 | Batz-Sohn et al. |
| 6,414,061 B1 | 7/2002 | Cruse et al. |
| 6,458,882 B1 | 10/2002 | Pyle et al. |
| 6,465,544 B1 | 10/2002 | Bomal et al. |
| 6,528,673 B2 | 3/2003 | Cruse et al. |
| 6,579,949 B1 | 6/2003 | Hergenrother et al. |
| 6,608,125 B2 | 8/2003 | Cruse et al. |
| 6,664,328 B1 | 12/2003 | Rodewald et al. |
| 6,683,135 B2 | 1/2004 | Cruse et al. |
| 6,777,569 B1 | 8/2004 | Westmeyer et al. |
| 6,790,921 B1 | 9/2004 | Rodewald et al. |
| 6,984,706 B2 | 1/2006 | Karato et al. |
| 7,074,876 B2 | 7/2006 | Cruse et al. |
| 7,081,500 B2 | 7/2006 | Cruse et al. |

(Continued)

FOREIGN PATENT DOCUMENTS

| | | |
|---|---|---|
| CN | 1842524 A | 10/2006 |
| CN | 1844169 A | 10/2006 |
| CN | 102372823 A | 3/2012 |
| EP | WO 99/09036 | 2/1999 |
| EP | 0 916 699 | 5/1999 |
| EP | 1 191 056 | 3/2002 |
| EP | 1 486 513 | 12/2004 |
| EP | 1 505 087 | 2/2005 |
| EP | 1 605 002 | 12/2005 |
| WO | WO 03/097734 | 11/2003 |
| WO | WO 2005/021528 A1 | 3/2005 |

(Continued)

OTHER PUBLICATIONS

PCT/EP2012/054919 International Search Report dated Jul. 27, 2012 (3 pages including English translation).

(Continued)

*Primary Examiner* — Michael C Miggins
(74) *Attorney, Agent, or Firm* — Eric D. Babych; Brinks Gilson & Lione

(57) ABSTRACT

A process for the continuous preparation of modified elastomeric polymers includes (i) providing and polymerizing at least one conjugated diene monomer and, optionally, one or more aromatic vinyl monomer in the presence of an anionic initiator and a compound according to Formula 1, e.g. 2,2-di-(2-oxolanyl)propane or a derivative thereof, to provide a living anionic polymer; and (ii) adding a "sulfanylsilane" compound to the living anionic polymer. Elastomeric polymers obtainable according to the above process and compositions including the elastomeric polymer and, optionally, further constituents such as oil, filler and/or vulcanizing agent are described. A process for the preparation of a cross-linked elastomeric polymer that includes adding a vulcanizing agent to the elastomeric polymer, as well as articles and compositions that include the elastomeric polymer, the cross-linked elastomeric polymer or both are described.

17 Claims, No Drawings

(56) References Cited

U.S. PATENT DOCUMENTS

| | | |
|---|---|---|
| 7,122,590 B2 | 10/2006 | Cruse et al. |
| 7,214,691 B2 | 5/2007 | Wu et al. |
| 7,683,151 B2 | 3/2010 | Endou et al. |
| 8,048,960 B2 | 11/2011 | Montoya-Goni et al. |
| 8,217,103 B2 | 7/2012 | Thiele et al. |
| 8,569,409 B2 | 10/2013 | Thiele et al. |
| 8,729,167 B2 | 5/2014 | Thiele et al. |
| 2002/0055564 A1 | 5/2002 | Cruse et al. |
| 2002/0055568 A1 | 5/2002 | Cruse et al. |
| 2002/0055646 A1 | 5/2002 | Cruse et al. |
| 2002/0099118 A1 | 7/2002 | Cruse et al. |
| 2003/0225195 A1 | 12/2003 | Cruse et al. |
| 2004/0181000 A1 | 9/2004 | Araujo-Da-Silva et al. |
| 2005/0049269 A1 | 3/2005 | Wu et al. |
| 2005/0124740 A1 | 6/2005 | Klockmann et al. |
| 2005/0154156 A1 | 7/2005 | Karato et al. |
| 2005/0159513 A1 | 7/2005 | Henning et al. |
| 2005/0159554 A1 | 7/2005 | Endou et al. |
| 2006/0014870 A1 | 1/2006 | Cruse et al. |
| 2006/0178485 A1 | 8/2006 | Shimakage et al. |
| 2006/0183866 A1 | 8/2006 | Pohl et al. |
| 2007/0083011 A1 | 4/2007 | Pohl et al. |
| 2008/0287601 A1 | 11/2008 | Thiele et al. |
| 2010/0087612 A1 | 4/2010 | Montoya-Goni et al. |
| 2011/0082253 A1 | 4/2011 | Thiele et al. |
| 2011/0301261 A1 | 12/2011 | Thiele et al. |
| 2012/0252952 A1 | 10/2012 | Thiele et al. |
| 2013/0090440 A1 | 4/2013 | Valenti et al. |

FOREIGN PATENT DOCUMENTS

| | | |
|---|---|---|
| WO | WO 2007/047943 | 4/2007 |
| WO | WO 2008/130782 | 10/2008 |
| WO | WO 2009/148932 | 12/2009 |
| WO | WO 2011/157742 | 12/2011 |

OTHER PUBLICATIONS

"Synthesis of end-functionalized polymer by means of living anionic polymerization", *Journal of Macromolecular Chemistry and Physics*, 197, pp. 3135-3148, 1996.

"Determination of sequence length distribution in SBR by ozonolysis-g.p.c. method", *Polymer*, vol. 22, pp. 1721-1723, 1981.

Examination Report from corresponding Chinese Application No. 201280071578.5, dated Jul. 31, 2015 (27 pages).

MODIFIED POLYMER COMPOSITIONS

This application claims priority to International Application No. PCT/EP2012/054919 filed Mar. 20, 2012; the entire contents of which is incorporated herein by reference.

The present invention relates to a process for the continuous preparation of modified elastomeric polymers, comprising the steps of (i) providing and polymerizing at least one conjugated diene monomer and, optionally, one or more aromatic vinyl monomer in the presence of an anionic initiator and a compound according to Formula 1, e.g. 2,2-di-(2-oxolanyl)propane or a derivative thereof, to provide a living anionic polymer; and (ii) adding a "sulfanylsilane" compound to the living anionic polymer.

The present invention also relates to elastomeric polymers that are obtainable according to the above process. In yet another embodiment, the present invention relates to a composition comprising the elastomeric polymer and, optionally, further constituents such as oil, filler and/or vulcanizing agent. The invention further relates to a process for the preparation of a cross-linked elastomeric polymer comprising the step of adding a vulcanizing agent to the elastomeric polymer. Moreover, cross-linked elastomeric polymers thus obtainable as well as articles and compositions comprising the elastomeric polymer, the cross-linked elastomeric polymer or both are described.

Living anionic polymers, including living conjugated polydienes and copolymers of conjugated dienes with aromatic alpha olefines, in particular living polybutadiene, living polyisoprene or copolymers of butadiene and/or isoprene with aromatic alpha olefins, including styrene, can be modified with "sulfanylsilane" compounds to give modified elastomeric polymers with altered properties. Such polymers are also sometimes referred to as "modified polymers" or "functionalized polymers". As disclosed in US 2008/0287601 A1, these modified polymers can be used in the preparation of rubber compositions. Such rubber compositions serve as a raw material for various applications, e.g. for the manufacture of tires. When cross-linked or cured, the rubber compositions were found to exhibit decreased values Tan δ at 60° C. without negatively impacting Tan δ at 0° C. values. In particular, tires were found to exhibit low rolling resistance if they comprise a rubber composition having reduced values Tan δ at 60° C. Such tires show good fuel economy and therefore meet current demands such as reduced emission of carbon dioxide. Tan δ at 0° C. values of the cross-linked rubber composition correspond to wet skid properties of articles such as tires comprising such a composition. Despite some advantages, there are, however, drawbacks associated with these modified prior art polymers.

When processing and compounding prior art elastomeric polymers with, e.g. fillers such as silica or carbon black, these polymers were found to exhibit increased Mooney viscosities (CMU; herein after also referred to as "Compound Mooney Viscosity") of the final composition, i.e. the composition comprising the modified polymer and further compounds such as, e.g. silica or carbon black. Increased values CMU, however, reduce throughput rates in the polymer compounding process and boost energy consumption when mixing. In some cases, the mixing equipment even fails completely to process materials of such high viscosity.

Prior art attempts to address these problems by means of starting materials focussed on modified polymers having reduced Mooney Viscosities (MU) before compounding. Low MU values of modified polymers were believed to allow for acceptably low CMU values in the final composition. However, compounding modified polymers having low viscosities turned out to be difficult. Specifically, processing such polymers in rubber production plants may yield sticky polymer crumbs, and the final polymer will likely show increased cold flow. While sticky polymer crumbs tend to agglomerate and cannot be dried efficiently, polymers showing increased cold flow may not be adequately packed and transported. Furthermore, if polymers cannot be dried efficiently, it will be difficult to calculate the correct polymer amount required according to polymer tire formulation recipes.

Therefore, there is a need to provide elastomeric polymers showing improved processing characteristics as compared to polymers obtained by conventional modification reactions, and allowing the provision of cross-linked (vulcanized) polymer compositions having decreased values Tan δ at 60° C. while values Tan δ at 0° C. are still sufficient. Moreover, there is a need for polymers facilitating the provision of articles such as tires having low rolling resistance and good wet skid properties. There is a further need for polymer compositions comprising "sulfanylsilane" modified polymers, silica and/or carbon black, and showing CMU values facilitating processing and compounding steps thereof. Particularly, there is a need for rubber formulations having reduced compound Mooney viscosity values (CMU) in their non-cured state during reactive mixing in combination with low hysteresis loss, as represented by low heat build-up and low Tan δ at 60° C. values, and good grip, as represented by high Tan δ at 0° C. (wet grip) and high Tan δ at −10° C. (ice grip) values, of the cured rubber formulations. Overall, there is a need to provide an efficient process for the manufacture of the desired polymers.

In a first aspect, the present invention therefore relates to a process for the continuous preparation of an elastomeric polymer. The present invention thus refers to a continuous polymerization process, said process comprising the steps of:

(i) providing and polymerizing at least one conjugated diene monomer and, optionally, one or more aromatic vinyl monomer at a temperature of 110° C. or less in an organic solvent in the presence of an active initiator and in the presence of a compound according to Formula 1:

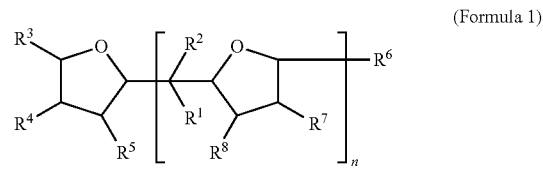

(Formula 1)

wherein O in Formula 1 is oxygen, R1 and R2 in Formula 1 are each independently hydrogen or an alkyl group, preferably hydrogen or a C1-C4 alkyl group; R3, R4, R5, R6, R7 and R8 are each independently selected from hydrogen or an alkyl group, preferably hydrogen or a C1-C6 alkyl group; n is an integer value selected from 1, 2, 3 or 4, preferably 1;

and wherein the active initiator is an anionic initiator and the molar ratio of the compound according to Formula 1/active initiator is from 0.15 to 10;

to provide a living anionic polymer; and (ii) adding a first quantity of a compound according to Formula 2 to the living anionic polymer in an amount such that the molar ratio of the compound according to Formula 2/active initiator is of from 0.21 or more:

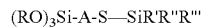

(Formula 2)

wherein S in Formula 2 is sulphur, Si is silicon, O is oxygen; groups R are each independently selected from alkyl, aralkyl or aryl, preferably from C1-C10 alkyl, C7-C17 aralkyl or C6-C16 aryl; groups R', R" and R'" are independently from each other selected from alkyl, aralkyl or aryl, preferably from C1-C10 alkyl, C6-C16 aryl or C7-C17 aralkyl; A is a divalent hydrocarbyl group, preferably C1-C20 alkylene or C7-C25 aralkylene.

The term "continuous process", "continuous polymerization" similar terms as used herein, refers to a polymerization process in which the solvent, at least one conjugated diene monomer and, optionally, one or more aromatic vinyl monomer, and all the ingredients, necessary to perform the polymerization reaction, are dosed to a reactor in specified ratios in a continuous manner. Typically, two or more polymerization reactors connected in series are used. In a preferred embodiment, steps (i) and (ii) as well as optional step (iii) which is described herein below are carried out in reaction vessels connected in series. Step (i) can be performed in more than one reactor vessel but, preferably, step (i) is performed in one reactor vessel. Preferably, the flow of the solvent, the at least one conjugated diene monomer and, optionally, the one or more aromatic vinyl monomer, and all the ingredients necessary to perform the polymerization reaction (including the anionic initiator and the compound according to Formula 1) are adjusted such that the mean residence time of the reaction mixture during each of steps (i), (ii) and, optionally step (iii) is in the range of from 30 to 150 minutes. If individual steps (i), (ii) and, optionally (iii) are carried out in individual, subsequent reaction vessels, it is thus preferred that the flow rates are adjusted in order to achieve residence times of from 30 to 150 minutes in each reaction vessel. In one embodiment, the residence times may range from 30 to 90 minutes. In another embodiment, the residence times may range from 90 to 150 minutes.

The monomers provided in step (i) of the process according to the present invention include at least one conjugated diene monomer. Representative conjugated diene monomers include but are not limited to 1,3-butadiene, 2-alkyl-1,3-butadiene, isoprene (2-methyl-1,3-butadiene), 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene, 1,3-cyclooctadiene, and combinations thereof. Preferred conjugated dienes include but are not limited to 1,3-butadiene, isoprene, and combinations thereof.

In addition to the at least one conjugated diene monomer, other polymerizable monomers may additionally be provided in step (i). Suitable examples of additional monomers include without limitation olefins selected from α-olefins, internal olefins, cyclic olefins, polar olefins or non-conjugated diolefins. Preferred additional monomers are C2-20 α-olefins, including, but not limited to, long chain macromolecular α-olefins and aromatic vinyl compounds.

In a preferred embodiment, the present invention relates to a process wherein in step (i) one or more aromatic vinyl monomers are provided as additional monomer. Representative examples of aromatic vinyl monomers include but are not limited to styrene and its derivatives, including but not limited to $C_{1-4}$ alkyl substituted styrenes, such as 2-methylstyrene, 3-methylstyrene, 4-methylstyrene, 2,4-dimethylsytrene, 2,4,6-trimethylstyrene, α-methylstyrene, and stilbene, 2,4-diisopropylstyrene, 4-tert-butylstyrene, vinyl benzyl dimethylamine, (4-vinylbenzyl)dimethyl aminoethyl ether, N,N-dimethylaminoethyl styrene, tert-butoxystyrene, vinylpyridine, and mixtures thereof. Preferred aromatic vinyl monomers include styrene, 4-methylstyrene, and a combination thereof.

Suitable polar olefins include acrylonitrile, methacrylates and methylmethacrylate. Suitable nonconjugated olefins include C4-20 diolefins, especially norbornadiene, ethylidenenorbornene, 1,4-hexadiene, 1,5-hexadiene, 1,7-octadiene, 4-vinylcyclohexene and divinylbenzene, including 1,2-divinylbenzene, 1,3-divinylbenzene and 1,4-divinylbenzene, and mixtures thereof.

In one embodiment of the present invention, the process comprises the polymerization of conjugated dienes, preferably 1,3-butadiene or isoprene to give a homopolymer. In a further embodiment, the process involves the polymerization of at least one conjugated diene, preferably 1,3-butadiene or isoprene, with at least one conjugated diene; and/or with at least one aromatic α-olefin, preferably with at least one aromatic vinyl monomer, more preferably with styrene or 4-methylstyrene; and/or with at least one aromatic diolefin, preferably divinylbenzene, to give random or block co- or terpolymers.

The solvent used in accordance with the invention is an organic solvent suitable for anionic polymerization reactions. Anionic polymerization reactions proceed according to an anionic polymerization mechanism. Throughout the polymerization, the polymer chain-end is ionic or "living". In one embodiment, the polymerization solvent is selected from non-polar aromatic and non-aromatic solvents including butane, pentane, cyclohexane, hexane, heptane and octane. In a preferred embodiment, the solvent is selected from one or more of butane, cyclohexane, hexane and heptane. Preferably, the Solid Content of Monomers is from 6 to 24 percent by weight, more preferably from 10 to 18 percent by weight and most preferably from 12 to 15 percent by weight based on the total weight of monomers and solvent. The term "total solid content of monomers", "solid content of monomers", or similar terms as used herein refer to the total mass (or weight) percentage of monomers based on the total weight of solvent and monomers (e.g. butadiene and styrene).

The initiator used to start the polymerization reaction in accordance with the present invention is an anionic initiator. Suitable examples of anionic initiators include organo metal compounds having at least one lithium atom, the organo metal compounds containing a non-polar C1-C20 hydrocarbon group. Preferably, the organo metal compound is an alkyl lithium compound (hereinafter also referred to as alkyl lithium), such as ethyl lithium, propyl lithium, n-butyl lithium, sec-butyl lithium, tert-butyl lithium, phenyl lithium, hexyl lithium and 1,4-dilithio-n-butane, or a mixture of two or more of these compounds. Most preferably, n-butyl lithium, sec-butyl lithium or a mixture thereof is used as anionic initiator in accordance with the present invention.

The above initiators may be used alone or in combination as a mixture of two or more different kinds. The amount of initiator used varies based upon the monomers being polymerized and it also depends on the target molecular weight of the produced polymer; however, the amount is typically between 0.0124 mol of initiator/kg of monomer (total polymerizable monomer) and 0.00143 mol of initiator/kg of monomer (total polymerizable monomer) if the target number average molecular weight Mn is from 80000 g/mol to 700000 g/mol.

The term "active initiator" (in the following also referred to as "I*") as used herein, refers to the amount of initiator that takes part in the polymerization reaction, and that is not deactivated by impurities contained in the reaction medium.

For example, in the polymerization of butadiene and styrene in the presence of butyl lithium as anionic initiator, the active butyl lithium content.

(nl*[mol/min]) is calculated based on the absolute number average molecular weight (Mn) of the living anionic polymer obtained in step (i), the conversion, and the total charged amount of monomers $$\dot{n}_{I^*}(\text{mol/min}) = \frac{(\dot{m}_{Bde}(\text{g/min}) + \dot{m}_{Sty}(\text{g/min})) \times C}{Mn(\text{g/mol})},$$

$(\dot{m}_{Bde}(\text{g/min}) + \dot{m}_{Sty}(\text{g/min}))$.

where
C=Momomer Conversion, and
Mn=number average molecular weight of the living anionic polymer obtained in step (i) prior to the addition of the compound according to Formula 2.

The compound according to Formula 1 above, preferably 2,2-di-(2-oxolanyl)propane or a derivative thereof is used in accordance with the present invention as a polar compound to adjust the composition distribution of the aromatic vinyl monomer as optional comonomer in the polymer and, thus, serve as a randomizer compound. The compound according to Formula 1 above, preferably 2,2-di-(2-oxolanyl)propane or a derivative thereof is also used in accordance with the present invention as a polar compound to adjust the composition distribution and the amount of the 1,2-polybutadiene polymer units in the polymer or optional copolymer and, thus, serve as a randomizer compound. Furthermore, the compound according to Formula 1 above, preferably 2,2-di-(2-oxolanyl)propane or a derivative thereof is also used in accordance with the present invention as a polar compound to accelerate the polymerization rate. Without wishing to be bound by theory, the compound according to Formula 1 is also expected to interact with the cation, in particular with the lithium cation of the anionic initiator to adjust the 1,4 insertion of the conjugated diene monomer, in particular butadiene. In a preferred embodiment, R1 and R2 in Formula 1 are each independently a C1-C4 alkyl group; and R3, R4, R5, R6, R7 and R8 in Formula 1 are each independently selected from hydrogen or a C1-C6 alkyl group. In some embodiments, R3, R4, R5, R6, R7 and R8 are each hydrogen. In a preferred embodiment, n within formula 1 is 1. In an alternative embodiment, n is selected from 2, 3 or 4. If n in Formula 1 is not 1, then, preferably, R3 represents the same group as R6, R4 represents the same group as R7, and R5 represents the same group as R8.

In a further preferred embodiment, the compound according to Formula 1 above is 2,2-di-(2-oxolanyl)propane (in the following also abbreviated as "DTHFP"), hereinafter also referred to as di(tetrahydrofuryl)propane (in the following also abbreviated as "DOP").

The compound according to formula 1 is added at a molar ratio of the compound according to formula 1 to the active initiator within a range of from 0.15 to 10, preferably at a ratio of from 0.4 to 5, most preferably of from 0.8 to 3. The compound according to formula 1 may be directly added to the polymer solution without dilution; however, it may be beneficial to add the modifier in solution using an inert solvent, e.g. the solvent described above.

It has been found that the use of a compound according to formula 1 as polar modifier in accordance with the present invention allows a random incorporation of the optional aromatic vinyl monomer, e.g. styrene in the polymer chain.

Accordingly, the block content of the aromatic vinyl monomer, e.g. the styrene block content can be kept low, for example below 10 weight percent, preferably below 5 weight percent, more preferably below 3 weight percent based on the weight of the aromatic vinyl monomer in the polymer, and depending on the molar ratio of the compound according to formula 1 to the active initiator. A low block content of the aromatic vinyl monomer, in particular low styrene block content is typically required in the manufacture of tires. The term "styrene block fraction", "styrene block content", or similar terms as used herein refer to the weight fraction of styrene, based on the total amount of polymerized styrene in the polymer, which is incorporated as styrene sequences longer than six styrene units.

Step (i) of providing and polymerizing the monomers, i.e. at least one conjugated diene monomer and, optionally, one or more aromatic vinyl monomer is preferably carried out at a temperature above room temperature (25° C.). In a more preferred embodiment, the temperature in step (i) is in the range of 40 to 110° C., most preferably in the range of 50 to 95° C. In a further preferred embodiment, the temperature in both steps (i) and (ii) is in the range of 55 to 90° C.

In step (ii), the compound according to Formula 2 above is added to the living anionic polymer in an amount such that the molar ratio of the compound according to Formula 2/active initiator is of from 0.21 or mere, preferably of from 0.22 or more, more preferably of from 0.25 or more, even more preferably of from 0.28 or more and most preferably of from 0.3 or more.

In a preferred embodiment, each group R in Formula 2 is independently selected from C1-C10 alkyl, C7-C17 aralkyl or C6-C16 aryl; groups R', R" and R'" in Formula 2 are independently from each other selected from C1-C10 alkyl, C6-C16 aryl or C7-C17 aralkyl; and A in Formula 2 is preferably C1-C20 alkylene or C7-C25 aralkylene. In a more preferred embodiment, groups R, R', R" and R'" in Formula 2 are independently selected from methyl, ethyl, isopropyl, n-butyl, tert.-butyl and sec.-butyl; and divalent group A is an alkylene group, most preferably a straight or branched C1-C5 alkylene group. Preferred examples of compounds according to formula 2 include: $(MeO)_3Si-(CH_2)_3-S-SiMe_3$, $(EtO)_3Si-(CH_2)_3-S-SiMe_3$, $(PrO)_3Si-(CH_2)_3-S-SiMe_3$, $(BuO)_3Si-(CH_2)_3-S-SiMe_3$, $(MeO)_3Si-(CH_2)_2-S-SiMe_3$, $(EtO)_3Si-(CH_2)_2-S-SiMe_3$, $(PrO)_3Si-(CH_2)_2-S-SiMe_3$, $(BuO)_3Si-(CH_2)_2-S-SiMe_3$, $(MeO)_3Si-CH_2-S-SiMe_3$, $(EtO)_3Si-CH_2-S-SiMe_3$, $(PrO)_3Si-CH_2-S-SiMe_3$, $(BuO)_3Si-CH_2-S-SiMe_3$, $(MeO)_3Si-CH_2-CMe_2-CH_2-S-SiMe_3$, $(EtO)_3Si-CH_2-CMe_2-CH_2-S-SiMe_3$, $(PrO)_3Si-CH_2-CMe_2-CH_2-S-SiMe_3$, $(BuO)_3Si-CH_2-CMe_2-CH_2-S-SiMe_3$, $((MeO)_3Si-CH_2-C(H)Me-CH_2-S-SiMe_3$, $(EtO)_3Si-CH_2-C(H)Me-CH_2-S-SiMe_3$, $(PrO)_3Si-CH_2-C(H)Me-CH_2-S-SiMe_3$, $(BuO)_3Si-CH_2-C(H)Me-CH_2-S-SiMe_3$, $(MeO)_3Si-(CH_2)_3-S-SiEt_3$, $(EtO)_3Si-(CH_2)_3-S-SiEt_3$, $(PrO)_3Si-(CH_2)_3-S-SiEt_3$, $(BuO)_3Si-(CH_2)_3-S-SiEt_3$, $(MeO)_3Si-(CH_2)_2-S-SiEt_3$, $(EtO)_3Si-(CH_2)_2-S-SiEt_3$, $(PrO)_3Si-(CH_2)_2-S-SiEt_3$, $(BuO)_3Si-(CH_2)_2-S-SiEt_3$, $(MeO)_3Si-CH_2-S-SiEt_3$, $(EtO)_3Si-CH_2-S-SiEt_3$, $(PrO)_3Si-CH_2-S-SiEt_3$, $(BuO)_3Si-CH_2-S-SiEt_3$, $(MeO)_3Si-CH_2-CMe_2-CH_2-S-SiEt_3$, $(EtO)_3Si-CH_2-CMe_2-CH_2-S-SiEt_3$, $(PrO)_3Si-CH_2-CMe_2-CH_2-S-SiEt_3$, $(BuO)_3Si-CH_2-CMe_2-CH_2-S-SiEt_3$, $((MeO)_3Si-CH_2-C(H)Me-CH_2-S-SiEt_3$, $(EtO)_3Si-CH_2-C(H)Me-CH_2-S-SiEt_3$, $(PrO)_3Si-CH_2-C(H)Me-CH_2-S-SiEt_3$, $(BuO)_3Si-CH_2-C(H)Me-CH_2-S-SiEt_3$, $(MeO)_3Si-$ (CH$_2$)$_3$—S—SiMe$_2$tBu (EtO)$_3$Si—(CH$_2$)$_3$—S—SiMe$_2$tBu, (PrO)$_3$Si—(CH$_2$)$_3$—S—SiMe$_2$tBu, (BuO)$_3$Si—(CH$_2$)$_3$—S—SiMe$_2$tBu, (MeO)$_3$Si—(CH$_2$)$_2$—S—SiMe$_2$tBu, (EtO)$_3$Si—(CH$_2$)$_2$—S—SiMe$_2$tBu, (PrO)$_3$Si—(CH$_2$)$_2$—S—SiMe$_2$tBu, (BuO)$_3$Si—(CH$_2$)$_2$—S—SiMe$_2$tBu, (MeO)$_3$Si—CH$_2$—S—SiMe$_2$tBu, (EtO)$_3$Si—CH$_2$—S—SiMe$_2$tBu, (PrO)$_3$Si—CH—S—SiMe$_2$tBu, (BuO)$_3$Si—CH$_2$—S—SiMe$_2$tBu, (MeO)$_3$Si—CH$_2$—CMe$_2$-CH$_2$—S—SiMe$_2$tBu, (EtO)$_3$Si—CH$_2$—CMe$_2$-CH$_2$—S—SiMe$_2$tBu, (PrO)$_3$Si—CH$_2$—CMe$_2$-CH$_2$—S—SiMe$_2$tBu, (BuO)$_3$Si—CH$_2$—CMe$_2$-CH$_2$—S—SiMe$_2$tBu, ((MeO)$_3$Si—CH$_2$—C(H)Me-CH$_2$—S—SiMe$_2$tBu, (EtO)$_3$Si—CH$_2$—CH)Me-CH$_2$—S—SiMe$_2$tBu, (PrO)$_3$Si—CH$_2$—C(H)Me-CH$_2$—S—SiMe$_2$tBu, (BuO)$_3$Si—CH$_2$—C(H)Me-CH$_2$—S—SiMe$_2$tBu.

The compound according to Formula 2 (hereinafter also referred to as modifier 1) is preferably added at almost complete or at complete conversion of the at least one conjugated diene monomer and, if applicable, the one or more aromatic vinyl monomer, preferably at a conversion rate of the polymerization of between 85 and 100% by weight based on the amount of monomers provided. The phrase "amount of monomers provided", "charged amount of monomers", or similar terms as used herein, refer to the amount of monomers provided in the continuous polymerization process, e.g. at a given reactor. In a preferred embodiment, the conversion rate is between 92.0 and 99.9% by weight, preferably between 94.0 and 99.9% by weight based on the amount of monomers provided. The term "monomer conversion" as used herein refers to the monomer conversion (for example the sum conversion of styrene and butadiene) determined, e.g. at the outlet of a given polymerization reactor. Preferably, a substantial amount of the living polymer chain ends is not terminated prior to the reaction with modifier 1, i.e. the living chain ends are present and capable of reacting with this modifier in a polymer chain end modification reaction. In the course of the modification reaction, one or more than one polymer chain can react with modifier 1, i.e. with the compound according to formula 2. As a result, one or more than one polymer chain is linked to the functionality derived from the modifier compound.

The use of the compound according to formula 2 thus leads to "sulfanylsilane" modified polymers. In one embodiment, these polymers have a modification degree (mol % of "sulfanylsilane" modified chain-end based on the total number of produced macromolecules) of 20% or more, preferably 50% or more, most preferably 80% or more.

The compound according to formula 2 may be directly added to the polymer solution without dilution; however, it may be beneficial to add the modifier in solution using an inert solvent, e.g. the solvent described above.

Under the conditions described herein above for step (i), it is possible to obtain a high degree of randomization and a high degree of livingness. It is believed that the high degree of living polymer chains allows a high degree of polymer chains to connect with the compound according to formula 2 during step (ii) and, optionally, with the compound of Formula 3 in step (iii) described herein below. Without wishing to be bound by theory, it is believed that these conditions (including, e.g. a relative random distribution of, e.g. styrene and vinyl units and a high degree of polymer chains modified by the compound of Formula 2 and optionally by the compound of Formula 3) enable an efficient reduction of hysteretic energy loss measured as values Tan δ at 60° C. of cured polymer compositions comprising "sulfanylsilane" modified polymers and silica and/or carbon black. Moreover, it is believed that improved processing characteristics of these polymer compositions including CMU can be attributed to these conditions. It has been further found that the above conditions allow for a relatively narrow molecular weight distribution in the final polymer. For example, it has been observed that the final polymer can have a molecular weight distribution (MWD) of from 1.7 to 2.5, preferably from 1.9 to 2.1 which can be attributed to the high degree of livingness referred to above.

It has been found that carrying out the process as described above allows the provision of a modified elastomeric polymer demonstrating improved processing behavior when compared to other elastomeric "sulfanylsilane" modified polymers. In particular, elastomeric polymers according to the present invention show improved processing characteristics during reactive mixing, i.e. when combined with fillers such as silica or carbon black to give silica-rubber or carbon black rubber formulations. This improvement can be measured as reduction of compound Mooney viscosity (CMU) of the non-cured formulations (hereinafter also referred to as "first composition") comprising elastomeric polymers according to the present invention and a filler as compared to non-cured formulations comprising prior art polymers and a filler, provided that the Mooney viscosity of the (filler-free) elastomeric polymer according to the invention and the Mooney viscosity of the (filler-free) prior art elastomeric polymer are identical or at least similar. Alternatively, the improvement can be measured as reduction of the difference of the compound Mooney viscosity of the non-cured composition comprising a polymer and a filler (first compostion) and the Mooney viscosity of the filler-free elastomeric polymer (Processing Improvement=ΔMooney=CMU$_{first\ composition}$−Mu$_{elastomeric\ polymer}$). The specific compound Mooney viscosities of these formulations allow an increased throughput during reactive mixing. At the same time, the elastomeric polymers obtainable according to the process of the present invention prove valuable when preparing cross-linked elastomeric polymers as described below.

In a preferred embodiment, 1,2-butadiene is added during step (i) above as additional component. Preferably, the molar ratio of 1,2-butadiene/active initiator is from 0.05 to 0.4, most preferably of from 0.1 to 0.2. It has been found that the use of 1,2-butadiene in combination with a compound according to formula 1 avoids gel formation and reactor fouling and, thus, contributes to an efficient polymerization process. Fouling of the polymerization reactor leads to the requirements of more frequent reactor cleanings.

In another embodiment, the process according to the present invention further comprises the additional step (iii) of:

(iii) subsequently adding a second quantity of the compound according to Formula 2 and/or adding a compound according to Formula 3 in an amount such that the molar ratio of the compound according to Formula 2 and/or Formula 3 as added in step (iii)/active initiator is of from 0.21 or more:

(RO)$_2$R''''Si-A-S—SiR'R''R'''     (Formula 3)

wherein groups R in Formula 3 are independently selected from alkyl, aralkyl or aryl groups, preferably from C1-C10 alkyl, C7-C17 aralkyl or C6-C16 aryl; groups R', R'' and R''' are independently selected from alkyl, aralkyl or aryl, preferably from C1-C10 alkyl, C6-C16 aryl or C7-C17 aralkyl; group R'''' is selected from an alkyl, aralkyl or aryl, preferably from C1-C10 alkyl, C6-C16 aryl or C7-C17 aralkyl; A is a divalent hydrocarbyl group, preferably C1-C20 alkylene or C7-C25 aralkylene.

Preferably, each group R in formula 3 is independently selected from C1-C10 alkyl, preferably C1-C4 alkyl; C7-C17 aralkyl, preferably C7-C10 aralkyl; or C6-C16 aryl, preferably C6-C12 aryl; groups R', R'', R''' and R'''' are independently from each other selected from C1-C10 alkyl, preferably C1-C6 alkyl; C6-C16 aryl, preferably C6-C12 aryl; or C7-C17 aralkyl, preferably C7-C10 aralkyl; and A is C1-C20 alkylene or C7-C25 aralkylene. Most preferably, each of R, R', R'', R''' and R'''' in formula 3 above is selected from methyl, ethyl, iso-propyl, n-propyl, n-butyl, iso-butyl, tert.-butyl, phenyl and benzyl; and A is —(CH2)m- wherein m is an integer value selected from 1, 2, 3, 4, 5 or 6, preferably from 3, 4, 5 or 6.

Adding a "second quantity" of the compound according to formula 2 is to be understood in the context of step (ii) above which comprises the mandatory addition of the compound according to formula 2 in the amount ("first quantity") identified above. In a preferred embodiment, step (iii) comprises the addition of the compound according to Formula 3. If step (iii) does not comprise the addition of a second quantity of the compound according to formula 2, then the compound according to formula 3 is added in an amount such that the molar ratio of the compound according Formula 3/active initiator is of from 0.21 or more, preferably of from 0.22 or more, more preferably of from 0.25 or more, even more preferably of from 0.28 or more and most preferably of from 0.3 or more. If, however, the optional step (iii) comprises the addition of a second quantity of the compound according to formula 2 without adding the compound according to formula 3, then this second quantity represents an amount such that the molar ratio of the compound according Formula 2/active initiator is from 0.21 or more. In this latter case, the overall amount of the compound according to formula 2 then results from steps (ii) and (iii) such that the overall molar ratio of the compound according Formula 2 as added in steps (ii) and (iii)/active initiator is from 0.42 or more. In a preferred embodiment, step (iii) of adding the second quantity of the compound according to formula 2 and/or adding a compound according to formula 3 is carried out by adding an excess amount of one or both of these compounds with respect to the molar amount of polymer chains that are still living after step (ii).

At the outlet of the polymerization reactor or the series of two or more polymerization reactors, a solution of an elastomeric polymer is obtained which is preferably mixed with an antioxidant.

The modified polymer resulting from the process according to the present invention can be worked up by a method known per se. In general the active or non-active residue of the initiator compound, of the residue of the compound of Formula 2 and, optionally, of Formula 3 is deactivated, at some point during the processing of the polymer, preferably after completion of process step (ii) or (iii), in a manner known per se, e.g. by means of water, organic acids, anionic acids or an alcohol. The use of water, organic acids, anionic acids or an alcohol furthermore renders metal organic residues derived from the polymerization initiator compound or metallated polymer chain ends less reactive and thus less dangerous. Removal of residues derived from the initiator compound and from the compounds of Formulae 1, 2 and, optionally 3 can sometimes be omitted, particularly when the quantity of components of the initiator and of the compounds according to Formulae 1, 2 and, optionally 3 is very low. If desired, however, the level of residues derived from the initiator, from the compound of Formula 1, from the compound of Formula 2 and/or from the compound according to Formula 3 can be reduced in the polymer in a known manner, for example, by washing. The deactivation step can be followed by a stripping step (removal of organic solvent(s) from the polymer).

It is preferred to steam-strip the polymer solution before the elastomeric polymer is dried. While steam stripping can be conducted in a stirred tank containing boiling water, drying can be carried out, e.g. by means of squeezing and heating, for example in a section consisting of two extruders. Alternatively, the solvent can be removed under reduced pressure.

After drying, the elastomeric polymer can be pressed into any desired shape, preferably into bales. Alternatively or subsequently, the elastomeric polymer can be mixed or compounded with, e.g. fillers. Mixing and compounding the elastomeric polymers with, e.g. fillers can, as a further alternative, be already conducted prior to solvent removal.

In a second aspect, the present invention thus relates to an elastomeric polymer obtainable according to the above process.

In one embodiment of the present invention, a softener such as oil may be used in combination with the elastomeric polymer to reduce viscosity or Mooney Viscosity values, or to improve processability and various performance properties of polymer compositions after vulcanization.

The oil(s) can be added to the elastomeric polymer prior to the end of the polymer preparation process or as a separate component after polymerization, for example after steam stripping. Preferably, the oil is added in an amount of from 10 to 50 parts by weight of oil per 100 parts by weight of polymer. Representative examples and classifications of oils are indicated below.

Although there are no specific limitations regarding the content of 1,2-bonds and/or 3,4-bonds (hereinafter also red to as "vinyl content") of the conjugation diolefin portion of the elastomeric polymer, for most applications, the vinyl content of the elastomeric polymer is preferably from 10 to 90 percent by weight. The term "vinyl content" as used herein refers to the mass (or weight) percentage of, e.g. butadiene and isoprene that incorporates in the polymer chain in the 1.2 and in the 1.2 or 3.4 position, respectively, and is based on the portion of, e.g. butadiene and/or isoprene (total amount of polymerized butadiene and/or isoprene) in the polymer. In a more preferred embodiment the vinyl content ranges from 20 to 80 percent by weight. If the vinyl bond content in a polymer is less than 10 percent by weight, resulting products may have inferior wet skid resistance. If the vinyl content in the elastomeric polymer exceeds 90 percent by weight vinyl bonds, resulting products may exhibit compromised tensile strength and abrasion resistance, and relatively large hysteresis loss.

In one embodiment, the process according to the invention comprises the homopolymerization of 1,3-butadiene or isoprene in the absence of styrene to give a homopolymer, i.e. polybutadiene or polyisoprene. In a more preferred embodiment, however, the process involves the copolymerization of, e.g. 1,3-butadiene and styrene to give styrene-butadiene copolymers. The weight ratio of styrene to 1,3-butadiene is preferably of from 0 to 50, more preferably of from 5 to 45, most preferably of from 10 to 40 percent by weight. In one embodiment the styrene content of the copolymer ranges from 5 to 25 percent by weight. In another embodiment the styrene content of the copolymer ranges from 25 to 45 percent by weight. The term "styrene content"

as used herein refers to the mass (or weight) percentage of styrene in the polymer, based on the weight of the polymer.

In yet another embodiment of the invention, the elastomeric polymer has a molecular weight distribution (MWD) of 1.7 to 2.5, preferably of from 1.9 to 2.1. Preferably, the elastomeric polymer has a number average molecular weight (Mn) of from 80.000 to 700.000 g/mol, more preferably of from 110.000 to 300.000 g/mol.

While dependent upon the specific polymer and desired end use application, the modified elastomeric polymers of the present invention preferably have Mooney viscosity (ML 1+4, 100° C., as measured in accordance with ASTM D 1646 (2004), in the range from 0 to 150, preferably from 15 to 100, and more preferably in the range from 30 to 90 using a Monsanto MV2000 instrument. If the Mooney viscosity (ML 1+4, 100° C.) of the polymer is more than 150 MU, processability (filler incorporation and heat build up in the internal mixer, banding on the roll mill, extrusion rate, extrudate die swell, smoothness, etc.; is negatively impacted because compounding machinery used at the manufacturer of tires are not designed to handle such high Mooney rubber grades, and the cost of processing increases. In some cases, a Mooney viscosity (ML 1+4, 100° C.) of less than 15 or even sometimes of less than 30, may not be preferred due to increased tack and cold flow of the uncrosslinked elastomeric polymer, resulting in difficult handling, poor green strength, and poor dimensional stability during storage.

In a third aspect, the invention concerns a composition comprising the above elastomeric polymer. In a preferred embodiment, the composition comprises oil and/or a filler. In yet another embodiment, the composition comprises further optional additives. In other words, the elastomeric polymer or the composition comprising the elastomeric polymer may be blended with one or more filler, optionally oil and optionally other additives.

In a preferred embodiment, the elastomeric polymer is combined and reacted with filler(s) selected from the group comprising silica, carbon-silica dual phase filler, carbon black, carbon nano-tube filler, lignin, glass filler, layered silicates, such as for example magadiite, in some preferred embodiments comprising silica as main filler-component, and, optionally, additional constituents, including, but not limited to, processing aids, oils, vulcanization agents and silane coupling agents so as to form a first polymer composition.

In one embodiment, the first composition further comprises at least one additional, modified or un-modified, elastomeric polymer, optionally comprising an oil. Examples of preferred unmodified elastomeric polymers are listed in International Patent Publication No. WO 2009/148932, and styrene-butadiene copolymer, natural rubbers, polyisoprene, and polybutadiene are particularly preferred. It is desirable that the unmodified polymers have a Mooney viscosity (ML 1+4, 100° C. as measured in accordance with ASTM D 1646 (2004), as discussed above) in the range from 20 to 200, and preferably from 25 to 150. The subject composition preferably includes fillers, which serve as reinforcement agents.

The oil(s) can be added to the polymer prior to the end of the polymer preparation process and as a separate component the first polymer composition in accordance with the present teachings. For representative examples and classification of the oils see International Patent Application No. PCT/US09/045553 and U.S. Patent Application Publication No. 2005/0159513, each of which is incorporated herein by reference in its entirety. Representative oils include but are not limited to MES (Mild Extraction Solvate), TDAE (Treated Distillate Aromatic Extract), RAE (Residual Aromatic Extract) including but not limited to T-RAE and S-RAE, DAE including T-DAE and NAP (light and heavy naphthenic oils), including but not limited to Nytex 4700, Nytex 8450, Nytex 5450, Nytex 832, Tufflo 2000, and Tufflo 1200. In addition, native oils, including but not limited to vegetable oils, can be used as extender oils. Representative oils also include functionalized variartions of the aforementioned oils, particularly epoxidized or hydroxylated oils. Aforementioned oils comprise different concentrations of polycyclic aromatic compounds, parafinics, naphthenics and aromatics, and have different glass transition temperatures. The above mentioned types of oil have been characterized (*Kautschuk Gummi Kunststoffe*, vol. 52, pages 799-805). In some embodiments, the MES, RAE and TORE are extender oils for rubber.

Optionally, processing aids can be added to the first polymer compositions in accordance with the present teachings. Processing aids are usually added to reduce the first polymer composition viscosity. As a result, the mixing period is decreased and/or the number of mixing steps is reduced and, consequently, less energy is consumed and/or a higher throughput in the course of the rubber compound extrusion process is achieved. Representative processing aids which can optionally be used as a component in the first polymer compositions in accordance with the present teachings are described in the *Rubber Handbook, SGF, The Swedish Institution of Rubber Technology* 2000 and in Werner Kleemann, Kurt Weber, *Elastverarbeitung-Kennwerte und Berechnungsmethoden*, Deutscher Verlag für Grundstoffindustrie (Leipzig, 1990), each of which is incorporated herein by reference in its entirety. Examples of representative processing aids which can optionally be used as component in the first polymer compositions in accordance with the present teachings can be classified as follows:

(A) fatty acids including but not limited to oleic acid, priolene, pristerene and stearinsyra;

(B) fatty acid salts including but not limited to Aktiplast GT, PP, ST, T, T-60, 8, F; Deoflow S; Kettlitz Dispergator FL, FL Plus; Dispergum 18, C, E, K, L, N, T, R; Polyplastol 6, 15, 19, 21, 23; Struktol A50P, A60, EF44, EF66, EM16, EM50, WA48, WB16, WB42, WS180, WS280 and ZEHDL;

(C) dispersing agents and processing aids including but not limited to Aflux 12, 16, 42, 54, 25; Deoflow A, D; Deogum 80; Decsol H; Kettlitz Dispergator DS, KB, OX; Kettlitz-Mediaplast 40, 50, Pertac/GR; Kettlitz-Dispergator SI; Struktol FL and WE 212; and (D) dispersing agents for highly active white fillers including but not limited to Struktol W33 and WB42.

Bifunctionalized silanes and monofunctional silanes (herein also called "silane coupling agents") are also occasionally referred to as processing aids but are separately described below.

In some embodiments, a silane coupling agent (used for compatibilization of polymer and stated fillers) is added to the composition containing modified polymers as described herein and silica, layered silicate such as but not limited to magadiite or carbon-silica dual-phase filler, which is used as filler component. The typical amount of a silane coupling agent added is from about 1 to about 20 parts by weight and, in some embodiments, from about 5 to about 15 Parts by weight for 100 parts by weight of the total amount of silica and/or carbon-silica dual-phase filler.

Silane coupling agents can be classified according to the *Fritz Röthemeyer, Franz Sommer: Kautschuk Technologie*, (Carl Hanser Verlag 2006):

(A) bifunctionalized silanes including but not limited to Si 230 (EtO)$_3$Si(CH$_2$)$_3$Cl, Si 225 (EtO)$_3$SiCH=CH$_2$, A189 (EtO)$_3$Si(CH$_2$)$_3$SH, Si 69 [(EtO)$_3$Si(CH$_2$)$_3$S$_2$]$_2$, Si 264 (EtO)$_3$Si—(CH$_2$)$_3$SCN and Si 363 (EtO)Si((CH$_2$—CH$_2$—O)$_5$ (CH$_2$)$_{12}$CH$_3$)$_2$(CH$_2$)$_3$SH) (Evonic Industries AG); and (B) monofunctional silanes including but not limited to Si 203 (EtO)$_3$—Si—C$_3$H$_7$, and Si 208 (EtO)$_3$—Si—C$_8$H$_{17}$. Further examples of silane coupling agents are given in International Patent Application No. PCT/US2009/045553, and include but are not limited to bis-(3-hydroxy-dimethyl-silyl-propyl)tetrasulfide, bis-(3-hydroxy-dimethylsilyl-propyl)-disulfide, bis-(2-hydroxy-dimethylsilyl-ethyl)tetrasulfide, bis-(2-hydroxy-dimethylsilyl-ethyl)disulfide, 3-hydroxy-dimethylsilyl-propyl-N,N-dimethylthiocarbamoyltetrasulfide, and 3-hydroxy-dimethylsilyl-propylbenzothiazole tetrasulfide.

The elastomeric polymer in accordance with the present teachings may be mixed with one or more fillers to give a first composition. Fillers serve as reinforcement agents. Carbon black, silica, carbon-silica dual-phase filler, clay (layered silicates), calcium carbonate, magnesium carbonate, lignin, carbon nano tubes, amorphous fillers, such as glass particle based fillers, starch based fillers, and the like, and combinations thereof, are examples of suitable fillers. Examples of fillers are described in International Application No. PCT/US2009/045553 fully incorporated herein by reference. In some embodiments, the combined use of carbon black and silica, the use of carbon-silica dual-phase-fillers alone, or the combined use of carbon-silica dual-phase-filler and carbon black and/or silica are employed. Carbon black is manufactured by a furnace method and in some embodiments a nitrogen adsorption specific surface area of 50-200 m$^2$/g and DBP oil absorption of 80-200 ml/100 grams, for example, FEF; HAF, ISAF, or SAF class carbon black, is used. In some embodiments, high agglomeration type carbon black is used. Carbon black is typically added in an amount from 2 to 100 parts by weight, in some embodiments from 5 to 100 parts by weight, in some embodiments from 10 to 100 parts by weight, and in some embodiments from 10 to 95 parts by weight for 100 parts by weight of the total elastomeric polymer.

Examples of silica fillers include but are not limited to wet process silica, dry process silica, synthetic silicate-type silica, and combinations thereof. Silica with a small particle diameter and high surface area exhibits a high reinforcing effect. Small diameter, high agglomeration-type silica (i.e., having a large surface area and high oil absorptivity) exhibits excellent dispersability in the elastomeric polymer composition, representing desirable properties and superior processability. An average particle diameter of silica, in terms of a primary particle diameter, is in some embodiments from 5 to 60 nm, and in some embodiments from 10 to 35 nm. Moreover, the specific surface area of the silica particles (measured by the BET method) is in some embodiments from 35 to 300 m$^2$/g. For examples of silica filler diameters, particle sizes, and BET surfaces, see International Patent Application No. PCT/US2009/045553. Silica is added in an amount from 10 to 100 parts by weight, in some embodiments from 30 to 100 parts by weight, and in some embodiments from 30 to 95 parts by weight for 100 parts by weight of the total elastomeric polymer. Silica fillers can be used in combinations with other fillers including but not limited to carbon black, carbon-silica dual-phase-filler, clay, calcium carbonate, carbon nano tubes, magnesium carbonate, and combinations thereof.

Carbon black and silica may be added together; in which case the total amount of carbon black and silica added is from 30 to 100 parts by weight and, in some embodiments, from 30 to 95 parts by weight for 100 parts by weight of the total elastomeric polymer. So long as such fillers are homogeneously dispersed in the elastomeric composition, increasing quantities (within the above cited ranges) result in compositions having excellent rolling and extruding processability, and vulcanized, products exhibiting favorable hysteresis loss properties, rolling resistance, improved wet skid resistance, abrasion resistance, and tensile strength.

Carbon-silica dual-phase-filler may be used either independently or in combination with carbon black and/or silica in accordance with the present teachings. Carbon-silica dual-phase-filler can exhibit the same effects as those obtained by the combined use of carbon black and silica, even in the case where it is added alone. Carbon-silica dual-phase-filler is so called silica-coated-carbon black made by coating silica over the surface of carbon black, and is commercially available under the trademark CRX2000, CRX2002, or CRX2006 (products of Cabot Co.). Carbon-silica dual-phase-filler is added in the same amounts as previously described with respect to silica. Carbon-silica dual-phase-filler can be used in combinations with other fillers including but not limited to carbon black, silica, clay, calcium carbonate, carbon nano tubes, magnesium carbonate, and combinations thereof. In some embodiments, carbon black and silica, either individually or in combination, are used.

Silica, carbon black or carbon black-silica dual-phase-fillers or combinations thereof can be used in combination with natural fillers including but not limited to starch or lignin.

Examples of fillers are described in International Patent Application No. PCT/US2009/045553, which is incorporated herein by reference in its entirety.

In some embodiments, the silica incorporated in the rubber compound has a surface area determined by nitrogen adsorption (hereinafter referred to as "N2A") of from 150 to 300 m$^2$/g. A silica having N2A of less than 150 m$^2$/g leads to an unfavorably low reinforcing effect. A silica having N2A of more than 300 m$^2$/g provides a rubber compound with an increased viscosity and a deteriorated processability. In the case of carbon black incorporated into the rubber compound, a N2A from 60 to 150 m$^2$/g is suitable. A carbon black having N2A of less than 60 m$^2$/g leads to a low reinforcing effect. A carbon black having N2A of more than 150 m$^2$/g provides a rubber compound with an increased hysteresis loss and a deteriorated processability.

In one embodiment, silica is added in an amount from 10 to 100 parts by weight, in some embodiments from 30 to 100 parts by weight, and in some embodiments from 30 to 95 parts by weight for 100 parts by weight of the total polymer.

In another embodiment, carbon black is added in an amount from 2 to 100 parts by weight, in some embodiments from 5 to 100 parts by weight, in some embodiments from 10 to 100 parts by weight, and in some embodiments from 10 to 95 parts by weight for 100 parts by weight of the total polymer.

In yet another embodiment, carbon black and silica may be added together, in which case the total amount of carbon black and silica added, is from 30 to 100 parts by weight, and preferably from 30 to 95 parts by weight for 100 parts by weight of the total polymer.

In a further embodiment, the composition comprising the elastomeric polymer according to the present invention further comprises a vulcanizing agent. Sulfur, sulfur-containing compounds acting as sulfur-donors, sulfur-accelerator systems, and peroxides are the most common vulcanizing agents. Examples of sulfur-containing compounds acting as sulfur-donors include but are not limited to dithiodimorpholine (DTDM), tetramethylthiuramdisulphide (TMTD), tetraethylthiuramdisulphide (TETD), and dipentamethylenthiuramtetrasulphide (DPTT). Examples of sulfur accelerators include but are not limited to amine derivatives, guanidine derivatives, aldehydeamine condensation products, thazoles, thiuram sulphides, dithiocarbamates and thiophospahtes. Examples of peroxides used as vulcanizing agents include but are not limited to di-tert.-butyl-peroxides, di-(tert.-butyl-peroxy-trimethyl-cyclohexane), di-(tert.-butyl-peroxy-isopropyl-)benzene, dichloro-benzoylperoxide, dicumylperoxides, tert.-butyl-cumyl-peroxide, dimethyl-di(tert.-butyl-peroxy)hexane and dimethyl-di(tert.-butyl-peroxy)hexine and butyl-di(tert.-butyl-peroxy)valerate (*Rubber Handbook, SGF, The Swedish Institution of Rubber Technology* 2000). Further examples and additional information regarding vulcanizing agents can be found in Kirk-Othmer, *Encyclopedia of Chemical technology* $3^{rd}$, Ed., (Wiley Interscience, N.Y. 1982), volume 20, pp. 365-468, (specifically "Vulcanizing Agents and Auxiliary Materials" pp. 390-402).

A vulcanizing accelerator of sulfene amide-type, guanidine-type, or thiuram-type can be used together with a vulcanizing agent as required. Other additives such as zinc white, vulcanization auxiliaries, aging preventives, processing adjuvants, and the like may be optionally added. A vulcanizing agent is typically added to the polymer composition in an amount from 0.5 to 10 parts by weight and, in some preferred embodiments, from 1 to 6 parts by weight for 100 parts by weight of the total elastomeric polymer. Examples of vulcanizing accelerators, and the amount of accelerator added with respect to the total polymer, are given in International Patent Publication No. WO 2009/148932. Sulfur-accelerator systems may or may not comprise zinc oxide. Preferably zinc oxide is applied to as component of the sulfur-accelerator system.

In yet another aspect, the present invention thus relates to a process for the preparation of a crosslinked elastomeric polymer, comprising step (iv) of:

(iv) adding a vulcanizing agent to the elastomeric polymer or to a composition comprising the elastomeric polymer; and cross-linking the elastomeric polymer.

Step (iv) of vulcanizing the elastomeric polymer or the composition comprising the elastomeric polymer can be conducted using conventional vulcanization equipment and conventional vulcanizing agents referred to above.

The invention further relates to crosslinked elastomeric polymers obtainable according to the above process comprising step (iv), as well as to compositions comprising said crosslinked elastomeric polymer.

Moreover, the present invention is directed to articles comprising one of the compositions of the present invention. In other words, the invention thus relates to articles comprising compositions which comprise the elastomeric polymer or the crosslinked elastomeric polymer referred to above. In a preferred embodiment, the article according to the present invention is a tire tread, a tire side wall, a conveyer belt, a seal or a hose.

It has been found that the vulcanized elastomeric polymer compositions of the present invention exhibit low rolling resistance, low dynamic heat build up, and superior wet skid performance. Therefore, the polymer compositions of the present invention, preferably compositions containing modified polymers as described herein and fillers as well as a vulcanizing agent, and the vulcanized elastomeric polymer compositions, are well suitable for use in preparing tires, tire treads, side walls, and tire carcasses, as well as other industrial products such as belts, hoses, vibration, dampers, and footwear components. Moreover, the polymers according to the present invention show improved processability including improved incorporation and reduced heat built up in the mixing equipment, reduced banding on the roll mill, improved extrusion behaviour, reduced extrudate die swell, smoothness, etc.) when compared to the processability of prior art compositions comprising traditional modified polymers.

Beyond the above, it is observed that the modified elastomeric polymers according to the invention can be used for the modification of plastics, particularly in polystyrene in the preparation of HIPS (high impact polystyrene), in styrene-acrylnitrile copolymers in the preparation of ABS (acrylnitrile-butadiene-styrene copolymers), polyurethane or in polycarbonate.

The invention will now be described in further detail by way of the following examples.

Test Methods

Size Exclusion Chromatography

Molecular weight and molecular weight distribution of the polymer were each measured using Size Exclusion Chromatography (SEC) based on polystyrene standards. Each polymer sample (9-11 mg) was dissolved in tetrahydrofuran (10 mL) to form a solution. The solution was filtered using a 0.45-µm filter. A 100-µL sample was fed into a GPC column (Hewlett Packard system 1100 with 3 PLgel 10 µm MIXED-3 columns). Refraction Index-detection was used as the detector for analyzing the molecular weight. The molecular weight was calculated as polystyrene based on the calibration with EasiCal PSI (Easy A and B) Polystyrene standards from Polymer Laboratories. The number-average molecular weight (Mn) figures and the weight-average molecular weight (Mw) figures are given based on the polystyrene standards. The molecular weight distribution is expressed as the dispersity D=Mw/Mn.

GC Analysis to Measure Monomer Conversion

Monomer conversion was determined by measuring the residual monomer concentration in the polymer solution at the end of the polymerization by means of gas chromatography.

About 0.5 g of polymer solution was collected in a 20 ml vial and diluted 1:10 using cyclohexane solvent. About 30 mg of the diluted sample was weighed by help of a syringe into a sealed headspace vial. The sample was heated to 140° C. for minutes. The headspace was analyzed by GC using the following conditions shown in Table A.

TABLE A

| Device: | HP 5890 with HP 7694 |
|---|---|
| Column: | PE-1 60 m × 0.32 mm × 1.0 µm |
| Detector: | FID |
| Temperature Program: | From 40° C. to 150° C., 8° C./min.; hold 0.5 min |
| Head pressure: | 110 kPa |

Quantification was performed by external standard technique.

The maximum solid content is calculated based on the total amount of ingredients fed.

TSC max=(g/minBde+g/minSty)/(TF)*100%

TF (Total Flow, g/min)=(Bde (g/min)+Sty (g/min)+ DOP (g/min)+BuLi (g/min)+1,2-Butadiene (g/min)+Cyclohexane (g/min)).

Bde=1,3-Butadiene
Sty=Styrene
BuLi=Butyl Lithium

The result of GC analysis is normally given in ppm of residual monomers contained in the original polymer solution.

The amount of residual monomers (RM) in "g/min" can be calculated from the following formula:

RM (g/min)=((((g/minBde+g/minSty)/TSC max)*100)/1000000)*(ppmBde+ppmSty)

or alternatively

RM (g/min)=(TF/1000000)*(ppmBde+ppmSty)

The monomer conversion was calculated as:

C (%)=100−(RM/(g/minBd+g/minSt)*100

1H-NMR

Vinyl and total styrene content were measured using 1H-NMR, according to ISO 21561-2005, using a NMR spectrometer BRUKER Avance 400 MHz), and a 5-mm dual probe. CDCl3/TMS was used as solvent in a weight ratio of 0.05%:99.95%. The content of block styrene consisting of more than 6 consecutive styrene units was determined according to the method reported by Y. Tanaka at al. in Rubber Chemistry and Technology, 1981, 54, No. 4, 685-691 using the relative intensity of ortho Ph-proton signals resonating higher than 6.7 ppm.

Mooney Viscosity ML1+4 (100° C.)

Mooney viscosity was measured according to ASTM D1646 (2004), with a preheating time of one minute, and a rotor operation time of four minutes, at a temperature of 100° C. [ML14-4 (100° C.)] on a MV2000 E from Alpha-Technologies.

GC Analysis to Measure the Concentration of the Compound According to Formula 2 and 3

The concentration of the Compound according to Formula 2 and 3 in the polymer solution was measured by means of gas chromatography under the conditions set forth in table 3.

0.4-0.6 g of polymer solution was collected in a 10 ml vial and diluted with about 5 g cyclohexane. The analysis is performed with an autosampler. In each vial 1 ml of polymer sample was added. A calibration with 3 different solutions of known concentration of Modifier 1 was performed.

TABLE B

| Device: | Agilent-GC6890 |
|---|---|
| Column: | Capillary Column |
| | Model Number: Restek 13423 |
| Temperature Program: | From 50° C. to 200° C., |
| | 15° C./min, hold 15 min |
| | Mode: Spli |
| Inlet | Initial temp: 230° C. (On) |
| | Pressure: 130.0 kPa (On) |
| | Split ratio: 10:1 |
| | Split flow: 18.2 mL/min |
| | Total flow: 22.8 mL/min |
| | Gas saver: Off |
| | Gas type: Helium |
| Detector: | Temperature: 250° C. (On) |
| | Hydrogen Flow: 30.0 mL/min (On) |
| | Air flow: 400.0 mL/min (On) |
| | Combined flow: 30.0 mL/min |

Vulcanizate Compound Properties

Rolling Resistance

Tan δ (60° C.) was measured using the dynamic spectrometer Eplexor 150N manufactured by Gabo Qualimeter Testanlage GmbH (germany) applying a compression dynamic strain of 0.2% at a frequency of 2 Hz at 60° C. The smaller the index, the lower the rolling resistance.

Grip

Tan δ (0° C.) was measured at 0° C. using the same equipment and load conditions as described above with respect to the rolling resistance. The larger the index the better the wet skid resistance.

Abrasion

Din Abrasion was measured according to DIN 53516. The larger the index, the lower the wear resistance.

EXAMPLES

Reactor Conditions

The following examples were performed by means of two or three continuous stirred tank reactors (CSTRs) connected in series. Each reactor had a volume of 5.8 liter, and was equipped with a helicoidal stirrer, suitable for mixing of high viscous solutions, the speed of the stirrer during all trials was 200 rpm. External water circulation in the reactor walls regulated the desired temperature. The reagents required for polymerization (styrene, 1,3-butadiene, cyclohexane, DOP (ditetrahydrofurylpropane), n-butyl lithium and 1,2-butadiene) were fed into the head of the first reactor with mass flow-meters. Each flow-meter regulated the desired feed, and guaranteed a constant flow of the reagent. Cyclohexane was purified by passing it through an alumina column.

In the description of the experiments the term "active initiator" (nBL,pm) refers to the amount of initiator (n-butyl lithium) that takes part in the polymerization reaction and that is not deactivated by impurities contained in the reaction medium. The term "excess initiator" (nBL,exc) refers to the amount of initiator that is charged to deactivate the impurities present in the system.

All the resulting polymer solutions were stripped with steam for one hour to remove solvent and other volatiles and dried in an oven at 70° C. for 30 minutes and another one to three days at room temperature.

Reagents

Cyclohexane (distilled) was used as a solvent. 1,3-butadiene (Bde) (distilled) and styrene (Sty) (dried via CaH2) were used as monomers. Ditetrahydrofuryl propane (DTHFP; DOP) and 1,2-butadiene (1,2-Bde) were diluted in cyclohexane. n-Butyl lithium (nBL) was used as anionic initiator. Unless explicitly stated otherwise, (CH30)3Si—(CH2)3-S—Si(CH3)2(C(CH3)3) was used as compound according to formula (hereinafter also referred to as Modifier 1) and (CH3O)2(CH3)Si—(CH2)3-S—Si(CH3)2(C (CH3)3) was used as compound according to formula 3 (hereinafter also referred to as Modifier 2).

Example 1

A styrene/butadiene copolymerization was performed using two reactors connected in series. The first reactor was used for the polymerization, Modifier 1 was added in the second reactor, the Modifier 1/nBL,pm molar ratio was 0.28.

In this trial a DOP/active initiator molar ratio of 1.609 was used. The temperature of the first reactor was 68° C. and the temperature of the second reactor was 70° C. The flow of the total amount of ingredients and solvent was regulated in order to achieve a residence time of 100 minutes in each reactor. The flow-rates of the ingredients added in the first reactor were the following: Sty=1.39 g/min, Bde=4.16 g/min, Cyclohexane=40.76 g/min, nBL~pm=0.03848 mmol/min, nBL,exc=0.003109, DOP=0.0619 mmol/min.

Modifier 1 was added in the second polymerization reactor with a flow-rate of 0.01061 mmol/min (conc. of Modifier 1 solution 0.00274 mol/l). A monomer conversion of 98.62% was obtained out of the first reactor, and a conversion of 99.97% was obtained out of the second reactor.

Methanol, as terminating agent, and IRGANOX 1520 (0.15 phr), as antioxidant, were added to the polymeric solution in the line out of the second reactor. The polymers coming out of the first and the second reactors were analyzed by GPC (with a polystyrene calibration). The following results were obtained for the polymer obtained in the first polymerization reactor: Mn=217929 g/mol, Mw=461253 g/mol, D=2.116. The following results were obtained for the polymer obtained in the second polymerization reactor: Mn=305554 g/mol, Mw=623149 g/mol, D=2.039. The following results were obtained for the polymer in the first polymerization reactor: styrene=25.7%, vinyl 62.7% (1,2-polybutadiene, calculated on the butadiene fraction)=%, block styrene (>6 styrene units): 1%.

The following results were obtained for the polymer in the second polymerization reactor: styrene=25.8%, vinyl (1,2-polybutadiene, calculated on the butadiene fraction)=62.9%, block styrene (>6 styrene units): 1%.

The Mooney Viscosity ML 1+4 of this product was 94.2.

Example 2

A styrene/butadiene copolymerization was performed using two reactors connected in series. The first reactor was used for the polymerization. Modifier 1 was added in the second reactor. The Modifier 1/nBL.pm molar ratio was decreased to 0.252.

In this trial a DOP/anionic initiator molar ratio of 1.464 was used. The temperature of the first reactor was 68° C. and the temperature of the second reactor was 70° C. The following amounts were added into the first polymerization reactor: Sty=1.39 g/min, Bde=4.16 g/min, Cyclohexane=40.76 g/min, nBL,pm=0.01967 mmol/min; DOP=0.0288 mmol/min. Modifier 1 was added in the second polymerization reactor with a flow rate of 0.00495 mmol/min (conc. of Modifier 1 solution 0.00274 mol/l). The flow of the total amount of ingredients and solvent was regulated in order to achieve a residence time in each reactor of 100 minutes.

A total conversion of 88.2% was obtained out of the first reactor, and a conversion of 92.02% was obtained cut of the second reactor. Methanol as terminating agent and IRGANOX 1520 (0.15 phr) as antioxidant were added to the polymeric solution in the line out of the second reactor. The polymers coming out of the first and the second reactors were analyzed by GPC (with a polystyrene calibration). The following results were obtained for the polymer obtained in the first polymerization reactor: Mn=380968 g/mol, Mw=799801 g/mol, D=2.099. The following results were obtained for the polymer obtained in the second polymerization reactor: Mn=428465 g/mol, Mw=896831 g/mol, D=2.093. The following results were obtained for the polymer in the first polymerization reactor: styrene=25.4%, vinyl 60.8% (1,2-polybutadiene, calculated on the butadiene fraction), block styrene (>6 styrene units): 1%.

The following results were obtained for the polymer in the second polymerization reactor: styrene=25.2%, vinyl (1,2-polybutadiene, calculated on the butadiene fraction)=60.9%, block styrene (>6 styrene units): 1%. The Mooney Viscosity ML 1+4 of this product was 115.4.

Example 3

A styrene/butadiene copolymerization was performed using three reactors connected in series. The first reactor was used for the polymerization. Modifier 1 was added in the second reactor and Modifier 2 was added in the third reactor. The Modifier 1/nBL,pm molar ratio was 0.388. The Modifier 2/nBL,pm molar ratio was 1.163.

Furthermore, in this example 1,2-butadiene was used. A DOP/nBL.pm molar ratio of 1.697 was used and a 1,2-butadiene/nBL,pm molar ratio of 0.2114 was used. The temperature of the first reactor was 68° C. The following amounts were added into the first polymerization reactor: Sty=1.39 g/min, Bde=4.17 g/min, Cyclohexane=40.76 g/min, nBL.pm=0.01892 mmol/min; DOP=0.0321 mmol/min, 1,2-butadiene=0.004 mmol/min.

Modifier 1 was added in the second polymerization reactor with a flow rate of 0.00734 mmol/min (conc. of Modifier 1 solution 0.00273 mol/l). Modifier 2 was added in the third reactor with a flow rate of 0.02201 mmol/min (conc. of Modifier 2 solution 0.0545 mol/l). The temperature of the second and the third reactor was 70° C. The residence time was 100 minutes in each reactor.

A monomer conversion of 91.97% was obtained cut of the first reactor, a conversion of 96.7% was obtained out of the second reactor and a conversion of 96.73% was obtained out of the third reactor.

Methanol as terminating agent and IRGANOX 1520 (0.15 phr) as antioxidant were added to the polymeric solution in the line out of the third reactor. The polymers coming out of the first and the second reactors were analyzed by GPC (with a polystyrene calibration). The following results were obtained for the polymer obtained in the first polymerization reactor: Mn=413244 g/mol, Mw=846182 g/mol, D=2.048. The following results were obtained for the polymer obtained in the second polymerization reactor: Mn=447261 g/mol, Mw=900845 g/mol, D=2.014. The following results were obtained for the polymer obtained in the third polymerization reactor: Mn=470670 g/mol, Mw=934077 g/mol, D=1.985.

The following results were obtained for the polymer in the first polymerization reactor: styrene=24.9%, vinyl 60.8% (1,2-polybutadiene, calculated on the butadiene fraction), block styrene (>6 styrene units): 1%.

The following results were obtained for the polymer in the second polymerization reactor: styrene=24.5%, vinyl (1,2-polybutadiene, calculated on the butadiene fraction)=61.2%, block styrene (>6 styrene units): 1%.

The following results were obtained for the polymer in the third polymerization reactor: styrene=24.2%, vinyl (1,2-polybutadiene, calculated on the butadiene fraction)=61.5%, block styrene (>6 styrene units): 1%.

The Mooney Viscosity ML 1+4 of this product was 112.

Example 4

The reaction was performed in 2 reactors connected in series. The first reactor was used for the polymerization, Modifier 1 was added in the second reactor. The Modifier 1/nBL,pm molar ratio was 0.644. In this trial a DOP/active initiator molar ratio of 1.608 was used. The temperature of the first reactor was 68° C. and the temperature of the second reactor was 70° C.

The following amounts were added into the first polymerization reactor: Sty=1.041 g/min, Bde=3.335 g/min, Cyclohexane=40.76 g/min, nBL,pm=0.03849, mmol/min; DOP=0.0619 mmol/min. Modifier 1 was added in the second polymerization reactor with a flow-rate of 0.0248 mmol/min (conc. of Modifier 1 solution 0.002739 mol/l). The residence time was 100 minutes in each reactor. A monomer conversion of 97.89% was obtained out of the first reactor, and a conversion of 99.96% was obtained out of the second reactor.

Methanol as terminating agent and IRGANOX 1520 (0.15 phr) as antioxidant were added to the polymeric solution in the line out of the second reactor. The polymers coming out of the first and the second reactors were analyzed by GPC (with a polystyrene calibration).

The following results were obtained for the polymer obtained in the first polymerization reactor: Mn=215666 g/mol, Mw=455748 g/mol, D=2.113. The following results were obtained for the polymer obtained in the second polymerization reactor: Mn=265780 g/mol, Mw=538284 g/mol, D=2.025.

The following results were obtained for the polymer in the first polymerization reactor: styrene=25.2%, vinyl 62.7% (1,2-polybutadiene, calculated on the butadiene fraction), block styrene (>6 styrene units): 1%. The following results were obtained for the polymer in the second polymerization reactor: styrene=25.2%, vinyl (1,2-polybutadiene, calculated on the butadiene fraction)=62.7%, block styrene (>6 styrene units): 1%.

The Mooney Viscosity ML 1+4 of this product was 67.6.

Example 5

A styrene/butadiene copolymerization was performed using three reactors connected in series. The first 2 reactors were used for the polymerization. Modifier 1 was added in the third reactor. The Modifier 1/nBL,pm molar ratio was 0.296. Furthermore, in this example 1,2-butadiene was used. A DOP/nBL.pm molar ratio of 1.925 was used and a 1,2-butadiene/nBL,pm molar ratio of 0.148 was used. The following amounts were added into the first polymerization reactor: Sty=4.724 g/min, Bde=13.8 g/min, Cyclohexane=132.33 g/min, nBL.pm=0.1256 mmol/min; DOP=0.2418 mmol/min, 1,2-butadiene=0.01860 mmol/min.

Modifier 1 was added in the third polymerization reactor with a flow rate of 0.03720 mmol/min (conc. of Modifier 1 solution 0.005446 mol/l). The temperature of all the reactors was 70° C. The residence time was 35 minutes in each reactor.

A monomer conversion of 91.04% was obtained out of the first reactor, a conversion of 99.73% was obtained out of the second reactor and a conversion of 99.94% was obtained out of the third reactor.

Methanol as terminating agent and IRGANOX 1520 (0.15 phr) as antioxidant were added to the polymeric solution in the line out of the third reactor. The polymers coming out of the first and the second reactors were analyzed by GPC (with a polystyrene calibration). The following results were obtained for the polymer obtained in the first polymerization reactor: Mn=205392 g/mol, Mw=397187 g/mol, D=1.934. The following results were obtained for the polymer obtained, in the second polymerization reactor: Mn=215441 g/mol, Mw=403586 g/mol, D=1.873. The following results were obtained for the polymer obtained in the third polymerization reactor: Mn=267466 g/mol, Mw=499838 g/mol, D=1.869.

The following results were obtained for the polymer in the first polymerization reactor: styrene=25.7%, vinyl 63.5% (1,2-polybutadiene, calculated on the butadiene fraction), block styrene (>6 styrene units): 1%.

The following results were obtained for the polymer in the second polymerization reactor: styrene=25.7%, vinyl (1,2-polybutadiene, calculated on the butadiene fraction) 63.8%, block styrene (>6 styrene units): 1%.

The following results were obtained for the polymer in the third polymerization reactor: styrene=25.8%, vinyl (1,2-polybutadiene, calculated on the butadiene fraction)=63.9%, block styrene (>6 styrene units): 1%.

The Mooney Viscosity ML 1+4 of this product was 63.1.

Example 6

A styrene/butadiene copolymerization was performed using three reactors connected in series. The first 2 reactors were used for the polymerization. Modifier 1 was added in the third reactor. The Modifier 1/nBL,pm molar ratio was 0.259.

Furthermore, in this example 1,2-butadiene was used. A DOP/nBL.pm molar ratio of 2.018 was used and a 1,2-butadiene/nBL,pm molar ratio of 0.155 was used. The following amounts were added into the first polymerization reactor: Sty=4.724 g/min, Bde=13.8 g/min, Cyclohexane=132.33 g/min, nBL.pm=0.1196 mmol/min; DOP=0.2418 mmol/min, 1,2-butadiene=0.01860 mmol/min.

Modifier 1 was added in the third polymerization reactor with a flow rate of 0.031 mmol/min (conc. of Modifier 1 solution 0.0310 mol/l). The temperature of all the reactors was 70° C. The residence time was 35 minutes in each reactor.

A monomer conversion of 88.87% was obtained out of the first reactor, a conversion of 99.43% was obtained out of the second reactor and a conversion of 99.71% was obtained out of the third reactor.

Methanol as terminating agent and IRGANOX 1520 (0.15 phr) as antioxidant were added to the polymeric solution in the line out of the second reactor. The polymers coming out of the first and the second reactors were analyzed by GPC (with a polystyrene calibration). The following results were obtained for the polymer obtained in the first polymerization reactor: Mn=121664 g/mol, Mw=409029 g/mol, D=1.923. The following results were obtained for the polymer obtained in the second polymerization reactor: Mn=222630 g/mol, Mw=408364 g/mol, D=1.834. The following results were obtained for the polymer obtained in the third polymerization reactor: Mn=253857 g/mol, Mw=485285 g/mol, D=1.912.

The following results were obtained for the polymer in the first polymerization reactor: styrene=25.9%, vinyl 64.4% (1,2-polybutadiene, calculated on the butadiene fraction), block styrene (>6 styrene units): 1%.

The following results were obtained for the polymer in the second polymerization reactor: styrene=26.2%, vinyl (1,2-polybutadiene, calculated on the butadiene fraction)=64.4%, block styrene (>6 styrene units): 1%.

The following results were obtained for the polymer in the third polymerization reactor: styrene=25.9%, vinyl (1,2-polybutadiene, calculated on the butadiene fraction)=64.5%, block styrene (>6 styrene units): 1%.

The Mooney Viscosity ML 1+4 of this product was 71.6.

TABLE 1

Molecular Weight and Molecular Weight Distribution after polymerization (step (i)) and at the end of the process (after step (ii) or (iii)) as well as Mooney Viscosity Values

| EXAMPLE | C | Mn, Mw and D of polymers obtained before addition of modifier 1 | | | Mn, Mw, D and Mooney Viscosity (MU) of polymers obtained at the end of the examples | | | |
|---|---|---|---|---|---|---|---|---|
| | | Mn (g/mol) | Mw (g/mol) | D | Mn (g/mol) | Mw (g/mol) | D | MU |
| 1 | 0.28 | 217929 | 461253 | 2.116 | 305554 | 623149 | 2.039 | 94.2 |
| 2 | 0.25 | 380968 | 799801 | 2.099 | 428465 | 896831 | 2.093 | 115.4 |
| 3 | 0.388[A] | 413244 | 846182 | 2.048 | 470670 | 934077 | 1.985 | 112.6 |
| 4 | 0.642 | 215666 | 455748 | 2.113 | 265780 | 538284 | 2.025 | 67.6 |
| 5 | 0.296 | 215441 | 403586 | 1.873 | 267466 | 499838 | 1.869 | 63.1 |
| 6 | 0.259 | 222630 | 408364 | 1.834 | 253857 | 485285 | 1.912 | 71.6 |

[A]Modifier 2 was added in the third reactor as described above with respect to example 3;
C: molar ratio (mol/mol) of the compound according to Formula 2/active initiator Example 7

Determination of Molar Amount of Living Chains

In the following example the % molar amount of living chains is evaluated. A continuous polymerization experiment was performed as described in the previous examples. A molar excess of Modifier 1 with respect to the moles of active initiator was added in the second reactor. Under these conditions each living chain should react with one molecule of Modifier 1. The residual amount of Modifier 1 in the polymer solution was analyzed via GC. The molar amount of living chain ends corresponds to the difference of the molar amount of Modifier 1 charged and the molar amount of Modifier 1 detected in the polymer solution.

The reaction was performed in 2 reactors connected in series. The first reactor was used for the polymerization. Modifier 1 was added in the second reactor. A molar excess of Modifier 1 was added in the second reactor: Modifier 1/nBL,pm molar ratio was 1.19.

In this trial a DOP/anionic initiator molar ratio of 1.605 was used. The temperature of the first reactor was 68° C. and the temperature of the second reactor was 70° C.

The following amounts were added into the first polymerization reactor: Sty=1.369 g/min, Bde=4.19 g/min, Cyclohexane=40.77 g/rain, nBL,pm=0.018 mmol/min; DOP=0.0289 mmol/min. Modifier 1 was added in the second polymerization reactor with a flow rate of 0.02146 mmol/min (conc. of Modifier 1 solution 0.00275 mol/l). The residence time in each reactor was 100 minutes. The feed concentration of Modifier 1 in the polymer solution was 127 ppm.

A monomer conversion of 88.7% was obtained out of the first reactor, and a conversion of 90.66% was obtained out of the second reactor. Methanol as terminating agent and IRGANOX 1520 (0.15 phr) as antioxidant were added to the polymeric solution in the line out of the second reactor. The polymers coming out of the first and the second reactors were analyzed by GPC (with a polystyrene calibration). The following results were obtained for the polymer obtained in the first polymerization reactor: Mn=418924 g/mol, Mw=873412 g/mol, D=2.085. The following results were obtained for the polymer obtained in the second polymerization reactor: Mn=435858 g/mol, Mw=869482 g/mol, D=1.995.

The following results were obtained for the polymer in the second polymerization reactor: styrene=25%, vinyl (1,2-polybutadiene, calculated on the butadiene fraction)=61.0%, block styrene (>6 styrene units): 1%. The following results were obtained for the polymer in the third polymerization reactor: styrene=24.9%, vinyl (1,2-polybutadiene, calculated on the butadiene fraction)=61.3%, block styrene (>6 styrene units): 1%.

The amount of Modifier 1 in the polymer solution out of the second reactor was analyzed with GC and resulted to be 26 ppm, which corresponds to 0.003885 mmol/min of Modifier 1 detected in the polymer solution out of the second reactor. This means that 0.01757 mmol/min of Modifier 1 reacted with the living chains and this number also corresponds to the number of chains which are still living in the second reactor. A degree of livingness of 97.6% is calculated in this experiment.

The data obtained in this experiment confirms that a very high degree of livingness can be obtained in the reaction conditions disclosed in this invention.

Example 8 (Comparative)

(Continuous Polymerization, Linear)

The reaction was performed in 2 reactors connected in series. Both reactors were used for the polymerization. In this trial a DOP/active initiator molar ratio of 2.048 and a 1,2-butadiene/nL.pm molar ratio of 0.162 was used. The temperature of the first reactor was 65° C. and the temperature of the second reactor was 70° C. The following amounts were added into the first polymerization reactor: Sty=3.58 g/min, Bde=11.04 g/min, Cyclohexane=107.25 g/min, nBL, pm=0.07631 mmol/min, nBL.exc=0.0151 mmol/min; DOP=0.1563 mmol/min, 1,2-butadiene=0.01234 mmol/min. The residence time was 38 minutes in each reactor.

A monomer conversion of 64.12% was obtained out of the first reactor, and a conversion of 99.01% was obtained out of the second reactor.

Methanol as terminating agent and IRGANOX 1520 (0.15 phr) as antioxidant were added to the polymeric solution in the line out of the second reactor. The polymers coming out of the first and the second reactors were analyzed by GPC (with a polystyrene calibration). The following results were obtained for the polymer obtained in the first polymerization reactor; Mn=246650 g/mol, Mw=489634 g/mol, D=1.985. The following results were obtained for the polymer obtained in the second polymerization reactor: Mn=269100 g/mol, Mw=504031 g/mol, D=1.873.

The following results were obtained for the polymer in the first polymerization reactor: styrene=26.5%, vinyl=63.4% % (1,2-polybutadiene, calculated on the butadiene fraction), block styrene (>6 styrene units): 1%. The following results were obtained for the polymer in the second polymerization reactor: styrene=26.9%, vinyl (1,2-polybutadiene, calculated on the butadiene fraction)=63.8%, block styrene (>6 styrene units): 1%.

The Mooney Viscosity ML 1+4 of the product was 66.5.

Example 9 (Comparative)

A styrene/butadiene copolymerization was performed using two reactors connected in series. The first reactor was used for the polymerization, Modifier 1 was added in the second reactor, the Modifier 1/nBL,pm molar ratio was 0.202.

In this trial a DOP/active initiator molar ratio of 1.764 was used. The temperature of the first reactor was 68° C. and the temperature of the second reactor was 70° C. The flow of the total amount of ingredients and solvent was regulated in order to achieve a residence time of 100 minutes in each reactor. The flow-rates of the ingredients added in the first reactor were the following: Sty=1.39 g/min, Bde=4.16 g/min, Cyclohexane=40.76 g/min, nBL.pm=0.03509 mmol/min, nBL,exc=0.003109, DOP=0.0619 mmol/min. Modifier 1 was added in the second polymerization reactor with a flow-rate of 0.00707 mmol/min (conc. of Modifier 1 solution 0.00274 mol/l). A monomer conversion of 97.40% was obtained out of the first reactor, and a conversion of 99.97% was obtained out of the second reactor.

Methanol, as terminating agent, and IRGANOX 1520 (0.15 phr), as antioxidant, were added to the polymeric solution in the line out of the second reactor. The polymers coming out of the first and the second reactors were analyzed by GPC (with a polystyrene calibration). The following results were obtained for the polymer obtained in the first polymerization reactor: Mn=291033 g/mol, Mw=643178 g/mol, D=2.21. The following results were obtained for the polymer obtained in the second polymerization reactor: Mn=299626 g/mol, Mw=671626 g/mol, D=2.242. The following results were obtained for the polymer in the first polymerization reactor: styrene=25.7%, vinyl 63% (1,2-polybutadiene, calculated on the butadiene fraction)=%, block styrene (>6 styrene units): 1%.

The following results were obtained for the polymer in the second polymerization reactor: styrene=25.7%, vinyl (1,2-polybutadiene, calculated on the butadiene fraction)=63%, block styrene (>6 styrene units): 1%.

The Mooney Viscosity ML 1+4 of product was 88.7.

Example 10 (Comparative)

The co-polymerization was performed in a double wall 20 liter steel reactor, which was first purged with nitrogen before the addition of organic solvent, monomers, polar coordinator compound, initiator compound or other components. The polymerization reactor was tempered at 40° C. The following components were then added in the following order: cyclohexane solvent (9000 g); 1,3-butadiene monomer (1514.35 g) and styrene monomer (41.4.52 g) and tetramethylethylene diamine (TMEDA) as polar coordinator 20.5 mmol, TMEDA/nBL,pm=1.720. The mixture was stirred for one hour. N-butyl lithium (11.92 mmol) was added to start the polymerization. The polymerization was performed for 80 minutes, not allowing the polymerization temperature to exceed 60° C. Afterwards, 7.75 g 1,3-butadiene monomer was added, followed by the addition of tin tetrachloride (0.903 mmol). The mixture was stirred for 20 minutes. Subsequently, another 27.9 g 1,3-butadiene monomer was added, followed by the addition of (CH3O)3Si—(CH2)3-S—Si(CH3)3 as compound according to formula 2 (10.16 mmol, Compound according to Formula 2/nBL, pm=0.852). For the termination of the polymerization process, the polymer solution was transferred after 45 minutes into a separated double wall steel reactor containing 100 ml ethanol and 1.4 ml of concentrated HCl (concentration 36%) and 5 g of irganox 1520 as stabilizer. The following results were obtained for the synthesized polymer: Mn=342581 g/mol, Mw=496873 g/mol, D=1.263, styrene=21%, vinyl=62.4%, Mooney Viscosity=62.4

Example 11 (Comparative)

The co-polymerization was performed in a double wall 10 liter steel reactor, which was first purged with nitrogen before the addition of organic solvent, monomers, polar coordinator compound, initiator compound or other components. The polymerization reactor was tempered at 40° C. The following components were then added in the following order: cyclohexane (5544 g); 1,3-butadiene monomer (773.82 g); styrene monomer (210 g); tetramethylethylene diamine as polar coordinator (10.385 mmol), TMEDA/nBL, pm=1.700. The mixture was stirred for one hour. N-butyl lithium (6,109 mmol) was added to start the polymerization. The polymerization was performed for 80 minutes, not allowing the polymerization temperature to exceed 60° C. Afterwards, another 14.18 g 1,3-butadiene monomer was added followed by the addition of CH3O)3Si—(CH2)3-S—Si(CH3)3 as compound according to formula 2 (7.262 mmol, compound according to formula 2/nBL,pm ratio=1.190). For the termination of the polymerization process, the polymer solution was transferred after 45 minutes into a separated double wall steel reactor containing 100 ml ethanol and 1.4 ml of concentrated HCl (concentration 36%) and 5 g of Irganox 1520 as stabilizer. The following results were obtained for the synthesized polymer: Mn=274259 g/mol, Mw=346417 g/mol, D=1.263, styrene=20.51%, vinyl=64.45%. Mooney Viscosity=65

The following tables provide an overview of molecular ratios employed in the foregoing examples (table 2) and summarize polymer characteristics (table 3).

TABLE 2

Summary of recipe details of all the examples

| EXAMPLE | A | B | C | D | SnCl4/nBL, pm |
|---|---|---|---|---|---|
| 1 | 1.609 | — | 0.280 | — | — |
| 2 | 1.464 | — | 0.252 | — | — |
| 3 | 1.697 | 0.211 | 0.388 | 1.163 | — |
| 4 | 1.608 | — | 0.644 | — | — |
| 5 | 1.925 | 0.148 | 0.296 | — | — |
| 6 | 2.018 | 0.155 | 0.259 | — | — |
| 8 | 2.048 | 0.162 | — | — | — |

TABLE 2-continued

Summary of recipe details of all the examples

| EXAMPLE | A | B | C | D | SnCl4/nBL, pm |
|---|---|---|---|---|---|
| 9 | 1.764 | — | 0.202 | — | — |
| 10[E] | 1.720[E] | — | 0.852 | — | 0.0780 |
| 11[E] | 1.700[E] | — | 1.190 | — | — |

A: molar ratio (mol/mol) of the compound according to formula 1/active initiator;
B: molar ratio (mol/mol) of 1,2-butadiene/active initiator;
C: molar ratio (mol/mol) of the compound according to formula 2/active initiator;
D: molar ratio (mol/mol) of the compound according to formula 3/active initiator
[E]in Examples 10 and 11, TMEDA was used as polar coordinator compound instead of the compound according to formula 1; the values indicated in column A thus refer to the molar ratio of TMEDA/active initiator;

TABLE 3

Polymer characteristics

| Polymer | Styrene Content (%) | Vinyl Content (%) | styrene block content (%) | Mn (kg/mol) | Mw (kg/mol) | D | Mooney Viscosity |
|---|---|---|---|---|---|---|---|
| Example 1 | 25.8 | 62.9 | 1 | 305 | 623 | 2.039 | 94.2 |
| Example 2 | 25.2 | 60.9 | 1 | 428 | 897 | 2.093 | 115.4 |
| Example 3 | 24.2 | 61.5 | 1 | 471 | 934 | 1.985 | 112.6 |
| Example 4 | 25.2 | 62.7 | 1 | 266 | 538 | 2.025 | 67.6 |
| Example 5 | 25.8 | 63.9 | 1 | 267 | 500 | 1.869 | 63.1 |
| Example 6 | 25.9 | 64.5 | 1 | 254 | 485 | 1.912 | 71.6 |
| Example 8 | 26.9 | 63.8 | 1 | 269 | 504 | 1.873 | 66.5 |
| Example 9 | 25.7 | 63 | 1 | 299 | 271 | 2.21 | 88.7 |
| Example 10 | 21.0 | 62.4 | 1 | 343 | 497 | 1.263 | 62.4 |
| Example 11 | 20.5 | 64.5 | 1 | 274 | 346 | 1.263 | 65 |

Preparation of Compositions Comprising a Filler

Compositions were prepared using the solution styrene butadiene rubber (SSBR) materials described in the foregoing examples, except example 7.

Silica Based Rubber Compositions

Polymer compositions were prepared by combining and compounding 80 parts by weight of each of the elastomeric polymers obtained in examples 1, 2, 3, 4, 5, 6, 8, 9, 10 and 11 with 20 parts by weight of commercially available high cis polybutadiene and the constituents listed below in Table 4, in a 350 cc Banbury mixer (Labstation 350S from Brabender GmbH&Co KG), following a two-stage mixing process. Stage 1: all components as indicated in table 4 were mixed together for 5 to 7 minutes at 60 to 80 rpm, except for the components of the vulcanizing agent (i.e. sulfur, TBBS, and DPG) to form a stage 1 formulation. Stage 2: Subsequently, the vulcanizing agent was added and the mixture was mixed for additional 2 to 3 minutes at 30 to 50 rpm to give stage 2 formulations. Mooney values were determined for each of these compositions "stage 2 formulation") and are indicated in table 5 below as "Mooney Compound" values. After preparation of stage 2 formulations, vulcanization was started by heating the stage 2 formulations at 160° C. for 20 minutes. After vulcanization, the compositions were left to reach room temperature to give compositions "1A" to "11A". The physical properties for each composition thus obtained are provided in Table 5. In this table, samples "1A" through "11A" designate compositions obtained from polymers described herein above in examples 1 to 11, except example 7.

TABLE 4

Recipe used for the preparation of compositions 1A to 11A.

| Components | | Amount phr[n] |
|---|---|---|
| Polymer according to Example 1 to 6, 8 or 10 or 11 | | 80.0 |
| High cis-polybutadiene | Buna cis 132-Schkopau[m] | 20.0 |
| Precipitated silica | Ultrasil 7000GR[f] | 80.0 |
| Silane | NXT[f,i] | 9.7 |
| Stearic acid[j] | | 1.0 |
| Stabilizer system: | | |
| Ozone protecting wax | Antilux 654[h] | 1.5 |
| Antiozonant | Dusantox[g] 6PPD | 2.0 |
| Zinc oxide[k] | | 2.5 |
| Softener (Oil) | TDAE[e] | 20.0 |
| Sulfur[d,l] | | 1.4 |
| TBBS[b,d] | | 1.5 |
| DPG[c,d] | | 1.5 | a 2 stage mixing, Brabender 350S, Internal Banbury mixer
[b]N-t-butyl-2-benzothiazolsulfenamide, Santocure-TBBS, Flexsys Inc.
[c]Diphenylguanidine, Vulkacit D, Lanxess AG
[d]Second stage (curing system)
[e]VivaTec 500, Hansen & Rosenthal KG
[f]Evonic AG
[g]N-(1,3-dimethylbutyl)-N'-phenyl-1,4-benzenediamine, Duslo a.s.
[h]Light & ozone protective wax, Rhein Chemie Rheinau GmbH
[i]Momentive
[j]Cognis GmbH
[k]Grillo-Zinkoxid GmbH
[l]Solvay AG
[m]Styron Deutschland GmbH
[n]Based on total weight of styrene butadiene copolymer and elastomeric diene polymer

TABLE 5

Compound Data. Mooney Viscosities data and vulcanizate compound properties

| | Mooney Polymer MU | Mooney Compound MU | ΔMooney MU | DIN Abrasion [mm3] | Grip (tan d @ 0° C.) | Rolling Resistance (tan d @ 60° C.) |
|---|---|---|---|---|---|---|
| 1A | 94.2 | 58.8 | −35.4 | 104 | 0.31 | 0.124 |
| 2A | 115.4 | 80.7 | −34.7 | 109 | 0.271 | 0.122 |
| 3A | 112.6 | 79.7 | −32.9 | 92 | 0.259 | 0.114 |
| 4A | 67.6 | 62.5 | −5.1 | 92 | 0.321 | 0.121 |
| 5A | 63.1 | 57 | −6.1 | 107 | 0.321 | 0.128 |
| 6A | 71.6 | 62.6 | −9 | 109 | 0.335 | 0.125 |
| 8A | 66.5 | 57.3 | −9.2 | 114 | 0.3208 | 0.13 |
| 9A | 88.7 | 52.7 | −36 | 119 | 0.33 | 0.158 |
| 10A* | 62.4 | 78.2 | 15.8 | 122 | 0.2428 | 0.0951 |
| 11A* | 65 | 74.2 | 9.2 | 93 | 0.2639 | 0.0966 |

*In these compounds the aromatic oil Enerdex 65 was used as softener in place of TDAE oil VivaTec 500

The "ΔMooney" value is the difference in Mooney viscosity values of the solvent-free polymer ("Mooney Polymer") and the compositions comprising a filler ("Mooney Compound"). Lower delta Mooney values are associated with a better processing behaviour.

The data reported in Table 5 shows that compositions 1A, 2A, 3A, 4A, 5A and 6A that are based on polymers according to the invention have improved processing characteristics as compared to compositions 10A and 11A which are based on polymers prepared in a batch polymerization process. At the same time, abrasion, grip and rolling resistance properties are improved as compared to comparative examples 8A and 9A that are based on polymers 8 and 9, respectively.

The compositions according to the present invention thus combine the positive processing behaviour (as observed with polymers that are obtainable in continuous polymerization processes) with favourable product properties such as abrasion, grip and rolling resistance. Compositions 1A, 2A, 3A, 4A, 5A and 6A display overall the best balance in terms of processing behaviour of the non-cured silica formulations and rolling resistance of the cured formulations.

The process of the invention thus yields modified elastomeric polymers with improved processing properties during reactive mixing of the modified elastomeric polymers with components of the composition as represented in Table 5. Without wishing to be bound by theory, the inventors believe that the improved processing behaviour is the result of the combination of a broad molecular weight distribution of the polymers (with respect to polymer produced in batch polymerisation processes) and an efficient polymer modification performed by using modifiers 1 and/or 2.

Particularly preferred embodiments (EMs) of the present invention are listed herein below:

1. A process for the continuous preparation of an elastomeric polymer, said process comprising the steps of:

(i) providing and polymerizing at least one conjugated diene monomer and, optionally, one or more aromatic vinyl monomer at a temperature of 110° C. or less in an organic solvent in the presence of an active initiator and a compound according to Formula 1:

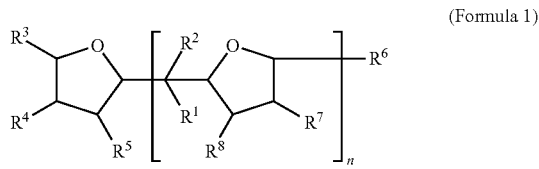

(Formula 1)

wherein O in Formula 1 is oxygen, R1 and R2 in Formula 1 are each independently hydrogen or an alkyl group, preferably hydrogen or a C1-C4 alkyl group; R3, R4, R5, R6, R7 and R8 are each independently selected from hydrogen or an alkyl group, preferably hydrogen or a C1-C6 alkyl group; n is an integer value selected from 1, 2, 3 or 4, preferably 1;

and wherein the active initiator is an anionic initiator and the molar ratio of the compound according to Formula 1/active initiator is from 0.15 to 10;

to provide a living anionic polymer; and (ii) adding a first quantity of a compound according to Formula 2 to the living anionic polymer in an amount such that the molar ratio of the compound according to Formula 2/active initiator is of from 0.21 or more:

(RO)$_3$Si-A-S—SiR'R''R''' (Formula 2)

wherein S in Formula 2 is sulphur, Si is silicon, O is oxygen; groups R are each independently selected from alkyl, aralkyl or aryl, preferably from C1-C10 alkyl, C7-C17 aralkyl or C6-C16 aryl; groups R', R'' and R''' are independently from each other selected from alkyl, aralkyl or aryl, preferably from C1-C10 alkyl, C6-C16 aryl or C7-C17 aralkyl; A is a divalent hydrocarbyl group, preferably C1-C20 alkylene or C7-C25 aralkylene.

2. The process according to EM 1, wherein step (ii) of adding the compound of Formula 2 to the living anionic polymer is started at a monomer conversion of between 85 and 100 percent by weight based on the amount of monomers provided.

3. The process according to any of EMs 1 or 2, wherein the molar ratio of the compound according to formula 1/active initiator is from 0.4 to 5.

4. The process according to any of the preceding EMs, wherein the process comprises the additional step (iii) of:

(iii) subsequently adding a second quantity of the compound according to Formula 2 and/or adding a compound according to Formula 3 in an amount such that the molar ratio of the compound according to Formula 2 and/or Formula 3 as added in step (iii)/active initiator is of from 0.21 or more:

(RO)$_2$R''''Si-A-S—SiR'R''R''' (Formula 3)

wherein groups R in Formula 3 are independently selected from alkyl, aralkyl or aryl groups, preferably from C1-C10 alkyl, C7-C17 aralkyl or C6-C16 aryl; groups R', R'' and R''' are independently selected from alkyl, aralkyl or aryl, preferably from C1-C10 alkyl, C6-C16 aryl or C7-C17 aralkyl; group R'''' is selected from an alkyl, aralkyl or aryl, preferably from C1-C10 alkyl, C6-C16 aryl or C7-C17 aralkyl; A is a divalent hydrocarbyl group, preferably C1-C20 alkylene or C7-C25 aralkylene.

5. The process according to EM 1, wherein R1 and R2 in Formula 1 are independently selected from hydrogen or C1-C4 alkyl; each of R2, R3, R4, R5, R6, R7 and R8 is independently selected from hydrogen or C1-C6 alkyl; n is 1; wherein in Formula 2, each group R is independently selected from C1-C10 alkyl, C7-C17 aralkyl or C6-C16 aryl; groups R', R'' and R''' are independently from each other selected from C1-C10 alkyl, C6-C16 aryl or C7-C17 aralkyl; and A is C1-C20 alkylene or C7-C25 aralkylene; and wherein in Formula 3, each group R is independently selected from C1-C10 alkyl, C7-C17 aralkyl or C6-C16 aryl; groups R', R'', R''' and R'''' are independently from each other selected from C1-C10 alkyl, C6-C16 aryl or C7-C17 aralkyl; and A is C1-C20 alkylene or C7-C25 aralkylene.

6. The process according to any of the preceding EMs, wherein the at least one conjugated diene monomer is selected from 1,3-butadiene, 2-alkyl-1,3-butadiene, 2-methyl-1,3-butadiene, 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene and/or 1,3-cyclooctadiene.

7. The process according to any of the preceding EMs, wherein the organic solvent is selected from one or more of butane, butane, pentane, cyclohexane, hexane, heptane, octane, benzene and toluene, preferably from one or more of butane, pentane, cyclohexane, hexane, and heptane.

8. The process according to any of the preceding EMs, wherein the anionic initiator comprises an organo metal compound having at least one lithium atom and comprising a non-polar C1-C20 hydrocarbon group or a mixture thereof.

9. The process according to EM 8, wherein the anionic initiator is an alkyl lithium, preferably n-butyl lithium, sec-butyl lithium or a mixture thereof.

10. The process according to any of the preceding EMs, wherein the compound according to Formula 1 is di(tetrahydrofuryl)propane.

11. The process according to any of the preceding EMs, wherein the temperature in step (i) is in the range of from 40 to 110° C.

12. The process according to any of the preceding EMs, wherein the temperature in step (i), step (ii) and optional step (iii) is in the range of from 55 to 90° C.

13. The process according to any of the preceding EMs, wherein step (i), step (ii) and optional step (iii) are carried out in reaction vessels connected in series.

14. The process according to EM 13, wherein the at least one conjugated diene monomer, the optional aromatic vinyl monomer, the anionic initiator and the compound according to Formula 1 are added into a first reaction vessel with a flow rate such that the mean residence time in each step (i) and (ii) as well as in optional step (iii) is from 30 to 150 minutes.

15. The process according to any of the preceding EMs, wherein 1,2-butadiene is added during step (i) as additional component.

16. The process according EM 15, wherein the molar ratio of 1,2-butadiene/active initiator is from 0.05 to 0.4.

17. The process according to any of the preceding EMs, wherein the at least one conjugated diene monomer and, optionally, the one or more aromatic vinyl monomer is provided in an amount such that the total solid content of monomers is from 6 to 24 percent by weight based on the total weight of monomers and solvent.

18. An elastomeric polymer obtainable according to any of the preceding EMs.

19. The elastomeric polymer according to EM 18, having a vinyl content of from 20 to 80 percent by weight and a styrene content of from 0 to 50, preferably of from 10 to 40 percent by weight.

20. The elastomeric polymer according to EMs 18 and 19, having a molecular weight distribution (MWD) of 1.7 to 2.5.

21. The elastomeric polymer according to any of EMs 18 to 20, wherein the polymer has a number average molecular weight Mn) of 80.000 to 700.000.

22. The elastomeric polymer according to any of EMs 18 to 21, wherein the polymer has a Mooney Viscosity ML 1+4 (100° C.) of 15 to 100.

23. A composition comprising elastomeric polymer according to any of EMs 18 to 22.

24. The composition according to EM 23, further comprising oil and/or a filler.

25. The composition according to EM 23 or 24, further comprising a vulcanizing agent.

26. The composition according to any of EMs 23 to 25, wherein the filler is selected from one or more of silica and carbon black.

27. A process for the preparation of a crosslinked elastomeric polymer, comprising step (iv) of:
(iv) adding a vulcanizing agent to the elastomeric polymer according to any of EMs 18 to 22 or to the composition according to any of EMs 23 to 26; and cross-linking the elastomeric polymer.

28. A crosslinked elastomeric polymer obtainable according EM 27.

29. A composition comprising the crosslinked elastomeric polymer according to EM 28.

30. An article comprising the composition according to any of EMs 23 to 26 or 29.

31. The article according to EM 30, wherein the article is a tire tread, a tire side wall, a conveyer belt, a seal or a hose.

The invention claimed is:

1. A process for the continuous preparation of an elastomeric polymer, said process comprising the steps of:
(i) providing and polymerizing at least one conjugated diene monomer and, optionally, one or more aromatic vinyl monomer at a temperature of 110° C. or less in an organic solvent in the presence of an active initiator and a compound according to Formula 1:

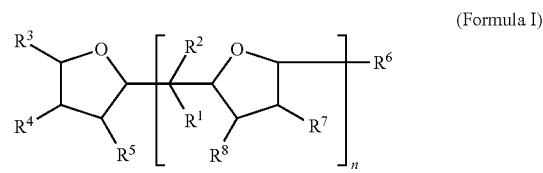

wherein O in Formula 1 is oxygen, R1 and R2 in Formula 1 are each independently hydrogen or an alkyl group; R3, R4, R5, R6, R7 and R8 are each independently selected from hydrogen or an alkyl group; n is an integer value selected from 1, 2, 3 or 4; and wherein the active initiator is an anionic initiator and the molar ratio of the compound according to Formula 1 to active initiator is from 0.15 to 10; to provide a living anionic polymer; and
(ii) adding a first quantity of a compound according to Formula 2 to the living anionic polymer in an amount such that the molar ratio of the compound according to Formula 2 to active initiator is of from 0.21 or more:

$$(RO)_3Si-A-S—SiR'R''R''' \quad \text{(Formula 2)}$$

wherein S in Formula 2 is sulphur, Si is silicon, O is oxygen; groups R are each independently selected from alkyl, aralkyl or aryl; groups R', R'' and R''' are independently from each other selected from alkyl, aralkyl or aryl; A is a divalent hydrocarbyl group.

2. The process according to claim 1, wherein step (ii) of adding the compound of Formula 2 to the living anionic polymer is started at a monomer conversion of between 85 and 100 percent by weight based on the amount of monomers provided.

3. The process according to claim 1, wherein the process comprises the additional step (iii) of:
(iii) subsequently adding a second quantity of the compound according to Formula 2 and/or adding a compound according to Formula 3 in an amount such that the molar ratio of the compound according to Formula 2 and/or Formula 3 as added in step (iii) to active initiator is of from 0.21 or more:

$$(RO)_2R''''Si-A-S—SiR'R''R''' \quad \text{(Formula 3)}$$

wherein groups R in Formula 3 are independently selected from alkyl, aralkyl or aryl groups; groups R', R'' and R''' are independently selected from alkyl, aralkyl or aryl; group R'''' is selected from an alkyl, aralkyl or aryl; A is a divalent hydrocarbyl group.

4. The process according to claim 1, wherein the at least one conjugated diene monomer is selected from 1,3-butadiene, 2-alkyl-1,3-butadiene, 2-methyl-1,3-butadiene, 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene and/or 1,3-cyclooctadiene.

5. The process according to claim 1, wherein the organic solvent is selected from one or more of butene, butane, pentane, cyclohexane, hexane, heptane, octane, benzene and toluene.

6. The process according to claim 1, wherein the anionic initiator comprises an organo metal compound having at least one lithium atom and comprising a non-polar C1-C20 hydrocarbon group or a mixture thereof.

7. The process according to claim 1, wherein the compound according to Formula 1 is di(tetrahydrofuryl)propane.

8. An elastomeric polymer obtainable according to claim 1.

9. A composition comprising the elastomeric polymer according to claim 8.

10. The composition according to claim 9, further comprising oil and/or a filler.

11. The composition according to claim 9, further comprising a vulcanizing agent.

12. The composition according to claim 9, wherein the filler is selected from one or more of silica and carbon black.

13. An article comprising the composition according to any of claim 9.

14. The article according to claim 13, wherein the article is a tire tread, a tire side wall, a conveyer belt, a seal or a hose.

15. A process for the preparation of a crosslinked elastomeric polymer, comprising step (iv) of:
  (iv) adding a vulcanizing agent to the elastomeric polymer according to claim 8 and cross-linking the elastomeric polymer.

16. A crosslinked elastomeric polymer obtainable according claim 15.

17. A composition comprising the crosslinked elastomeric polymer according to claim 16.

* * * * *